US012711087B2

(12) United States Patent
Xia et al.

(10) Patent No.: US 12,711,087 B2

(45) Date of Patent: Aug. 18, 2026

(54) INTERCONNECTION SYSTEM, DATA TRANSMISSION METHOD, AND CHIP

(71) Applicant: HUAWEI TECHNOLOGIES CO., LTD., Shenzhen (CN)

(72) Inventors: Jing Xia, Shenzhen (CN); Chunxiao Cai, Shenzhen (CN); Shuhao Tao, Chengdu (CN)

(73) Assignee: Huawei Technologies Co., LTD., Shenzhen (CN)

( * ) Notice: Subject to any disclaimer, the term of this patent is extended or adjusted under 35 U.S.C. 154(b) by 106 days.

(21) Appl. No.: 18/453,733

(22) Filed: Aug. 22, 2023

(65) Prior Publication Data

US 2023/0394000 A1 Dec. 7, 2023

Related U.S. Application Data

(63) Continuation of application No. PCT/CN2021/077501, filed on Feb. 23, 2021.

(51) Int. Cl.
*G06F 13/37* (2006.01)

(52) U.S. Cl.
CPC .......... *G06F 13/37* (2013.01); *G06F 2213/40* (2013.01)

(58) Field of Classification Search
CPC .... G06F 13/37; G06F 15/173; G06F 2213/40; H04L 12/12
See application file for complete search history.

(56) References Cited

U.S. PATENT DOCUMENTS

2005/0257105 A1* 11/2005 Robbins .............. G06F 11/2038 714/E11.074
2014/0115221 A1 4/2014 Ganasan et al.
2014/0122929 A1* 5/2014 Nixon .................. G06F 11/348 714/E11.17
2015/0006776 A1* 1/2015 Liu .................. G06F 15/17381 710/113
2015/0103822 A1 4/2015 Gianchandani et al.
(Continued)

FOREIGN PATENT DOCUMENTS

| | | | |
|---|---|---|---|
| CN | 1277386 | C | 9/2006 |
| EP | 2357762 | A1 | 8/2011 |
| JP | 3532574 | B2 | 5/2004 |

OTHER PUBLICATIONS

Extended European Search Report in European Appln. No. 21927121.0, mailed on Jan. 31, 2024, 7 pages.

*Primary Examiner* — Phong H Dang
(74) *Attorney, Agent, or Firm* — Fish & Richardson P.C.

(57) ABSTRACT

This application relates to an interconnection system. In an example, an interconnection system includes a plurality of circular data paths including at least one lateral circular data path and at least one longitudinal circular data path. The interconnection system further includes a data routing component disposed at an intersection on the at least one lateral circular data path and the at least one longitudinal circular data path. The data routing component is separately coupled to the at least one lateral circular data path and the at least one longitudinal circular data path. The interconnection system further includes at least one functional component disposed at a non-intersection corresponding to one of the at least one lateral circular data path and the at least one longitudinal circular data path.

15 Claims, 15 Drawing Sheets

(56) References Cited

U.S. PATENT DOCUMENTS

| | | | | |
|---|---|---|---|---|
| 2016/0188502 | A1* | 6/2016 | Sinclair | G06F 13/4068 710/104 |
| 2016/0283430 | A1* | 9/2016 | Ueda | H04N 19/423 |
| 2019/0018776 | A1* | 1/2019 | Sato | G06F 15/8015 |
| 2021/0406676 | A1* | 12/2021 | Qin | G06F 18/241 |

* cited by examiner

INTERCONNECTION SYSTEM, DATA TRANSMISSION METHOD, AND CHIP

CROSS-REFERENCE TO RELATED APPLICATIONS

This application is a continuation of International Application No. PCT/CN2021/077501, filed on Feb. 23, 2021, the disclosure of which is hereby incorporated by reference in its entirety.

TECHNICAL FIELD

This application relates to an interconnection system, a data transmission method, a chip, a device, and a computer-readable storage medium in a computing system.

BACKGROUND

With development of computing systems, derived consumer electronic products, servers, and software products have posed higher requirements on performance such as computing power, a bandwidth, and a delay of a system on a chip (SoC) chip. Generally, the performance of the SoC chip can be improved by increasing a quantity of cores on the SoC chip. The quantity of cores on the SoC chip increases, and a manner of interconnection communication between the cores has become a hot research topic. Generally, a network-on-chip (NoC) is used to implement on-chip interconnection.

Currently, commonly used NoC topology structures include a ring topology structure and a mesh topology structure. As shown in FIG. 1, the ring topology structure includes two circular data paths (Ring) with opposite data transmission directions, and there is no data exchange between the two rings, such as Ring A and Ring B shown in FIG. 1. Components are evenly distributed on the outside of Ring A and on the inside of Ring B. Each component determines to transmit data to one of the two rings according to a shortest path principle. However, if a quantity of components is increased, a scale of the ring topology structure is increased accordingly, and there is a relatively large delay in communication between the components, which is difficult to apply to a large-scale on-chip interconnection scenario. When a large quantity of modules need to be interconnected, the ring becomes large, and the communication delay between the modules increases with the ring size.

The mesh topology includes a plurality of rings. As shown in FIG. 2, the plurality of rings are arranged to form a mesh, and components are separately disposed at intersections of lateral rings and longitudinal rings, and separately exchange data with the lateral rings and the longitudinal rings. The mesh topology structure has poor scalability. As shown in FIG. 3, when a component A is newly added to the mesh topology structure shown in FIG. 2, a lateral ring (Ring C) and a plurality of components B that are used to exchange data between Ring C and an existing longitudinal ring need to be added to the mesh topology structure. This not only increases an area occupied by the mesh topology structure, but also increases expansion costs, to cause a lower area-efficiency ratio (system efficiency per unit area or performance improvement ratio).

SUMMARY

This application provides an interconnection system, a data transmission method, a chip, a device, and a computer-readable storage medium, to improve system performance per unit area of the interconnection system and reduce system expansion costs.

According to a first aspect, this application provides an interconnection system, including: a plurality of circular data paths, where the plurality of circular data paths include at least one lateral circular data path and at least one longitudinal circular data path; a data routing component, correspondingly disposed at an intersection on the at least one lateral circular data path and the at least one longitudinal circular data path, where the data routing component is separately coupled to the corresponding lateral circular data path and the corresponding longitudinal circular data path; and at least one functional component, further coupled at a non-intersection on at least one of the at least one lateral circular data path and the at least one longitudinal circular data path, where the at least one functional component is configured to transmit data to a destination component on another circular data path through a data routing component at an intersection on circular data paths to which the at least one functional component is coupled.

In the foregoing technical solution, one functional component is coupled at a non-intersection on a circular data path and is coupled to the circular data path. One data routing component is coupled at an intersection on a lateral circular data path and a longitudinal circular data path, and is separately coupled to the lateral circular data path and the longitudinal circular data path. The functional component may transmit the data to the destination component on the another circular data path through the data routing component coupled at the intersection on the circular data path to which the functional component is coupled, so that data exchange between the functional component and a component on the another circular data path can be implemented. When the interconnection system is expanded, a newly added functional component can be coupled at a non-intersection on any circular data path, without adding a circular data path or a data routing component, so that system performance per unit area of the interconnection system can be improved, and costs of expanding the interconnection system are also reduced.

In a possible design, the plurality of circular data paths are arranged in a mesh.

In the foregoing technical solution, the plurality of circular data paths in the interconnection system are arranged in the mesh, so that an area occupied by the interconnection system can be in a regular shape. In the field of computing systems, such a design facilitates integration on a substrate of a chip.

In a possible design, the system includes a plurality of functional components coupled at a plurality of non-intersections on a first circular data path of the plurality in circular data paths, and the plurality of functional components are arranged on a same side of the first circular data path.

In the foregoing technical solution, the plurality of functional components coupled to one circular data path are arranged on a same side. Alternatively, a plurality of functional components coupled to any circular data path are arranged on a same side of the circular data path, so that the functional components coupled to the circular data path can obtain a relatively large bandwidth, and a data transmission delay can be reduced.

In a possible design, at least one functional component is coupled to the at least one lateral circular data path, and at least one functional component is coupled to the at least one longitudinal circular data path.

In the foregoing technical solution, the interconnection system may include the plurality of functional components, at least one functional component is coupled to a lateral circular data path, and at least one functional component is coupled to a longitudinal circular data path. When data is exchanged between any two functional components in the interconnection system, the data may be transmitted through a data routing component at an intersection on a lateral circular data path and a longitudinal circular data path to which the two functional components are coupled. It can be learned that the data exchange between any two functional components in the interconnection system according to this application may be implemented by changing a circular data path once.

In a possible design, the functional component includes at least one of a computing component and a storage component; and the computing component is configured to process a computing task, and the storage component is configured to process a storage task.

In the foregoing technical solution, the functional component may be classified into at least two types: one type for computing and the other type for storage. The functional component may include a component for computing. The functional component may also include a component for storage. The functional component may further include both a component for computing and a component for storage. The functional component for computing may be denoted as a computing component, and can process a computing task. The functional component for storage may be denoted as a storage component, and can process a storage task. The interconnection system provided in this application may be applicable to a computing system that requires relatively large computing power, for example, a computing system in the field of artificial intelligence.

In a possible design, the computing component includes a neural network processor; and the storage component includes a memory.

In the foregoing technical solution, the interconnection system may be applied to the field of artificial intelligence. The computing power of the interconnection system can be improved. The neural network processor or the memory can be added when the interconnection system is expanded. In addition, when the neural network processor or the memory is added, a circular data path and a data routing component do not need to be added, so that expansion costs are relatively low, and improvement efficiency of the computing power of the interconnection system is relatively high.

In a possible design, the at least one functional component includes at least one computing component and at least one storage component. Each of the at least one computing component is coupled to a corresponding longitudinal circular data path. Each of the at least one storage component is coupled to a corresponding lateral circular data path.

In the foregoing technical solution, generally, there may be no data exchange between computing components (for example, neural network processors), and there may be no data exchange between storage components (for example, memories). The data can be exchanged between the computing component and the storage component. The computing component and the storage component are coupled to different types of circular data paths. In other words, if the computing components are all coupled to the longitudinal circular data paths, the storage components are all coupled to the lateral circular data paths; or if the computing components are all coupled to lateral circular data paths, the storage components are all coupled to the longitudinal circular data paths. In such a design, data exchange between the computing component and the storage component may be implemented by changing the circular data path once, and complexity of data transmission is low.

In a possible design, the data routing component is one of a central processing unit CPU, a network interface controller NIC, a peripheral component interconnect express PCIE, or a ring bridge.

In the foregoing technical solution, the data routing component in the interconnection system may be the ring bridge, and data exchange between the lateral circular data path and the longitudinal circular data path may be implemented through the ring bridge. The data routing component may alternatively be the CPU, the NIC, the PCIE, or the like. The data routing component not only has a function or capability of exchanging data between the lateral circular data path and the longitudinal circular data path, but also may have other functions or capabilities, so that the interconnection system can be applied to a more diversified scenario.

In a possible design, the at least one functional component is further configured to: transmit data carrying an address of a destination component to a circular data path to which the at least one functional component is coupled.

In a possible design, the data carries an address of a destination component, and the destination component receives the data if determining that the address of the destination component carried in the data is consistent with an address of the destination component.

In the foregoing technical solution, the data transmitted by the functional component to another circular data path may carry the address of the destination component. In such a design, a component that is coupled to the another circular data path and that corresponds to the address can receive the data transmitted by the functional component.

In a possible design, the data routing component is further configured to: store a first address set, where the first address set includes an address of another component coupled to the corresponding lateral circular data path and an address of another component coupled to the corresponding longitudinal circular data path.

In the foregoing technical solution, the data routing component may store the addresses of other components coupled to the lateral circular data path corresponding to the data routing component and the longitudinal circular data path corresponding to the data routing component. In such a design, the data routing component can determine, according to the pre-stored first address set that includes the addresses of other components, whether the data needs to be forwarded.

In a possible design, the data routing component is configured to: determine that the address of the destination component carried in the data is consistent with an address in the first address set, receive the data, and forward the data to a circular data path to which a component corresponding to the consistent address is coupled.

In the foregoing technical solution, after determining that the address of the another component coupled to the another circular data path in the pre-stored first address set is consistent with or the same as the address of the destination component carried in the data, the data routing component receives the data and forwards the data to the another circular data path, to transmit the data of the at least one functional component to the another circular data path. In a possible design, the data further carries an address or addresses of at least one forwarding component corresponding to the destination component; and the at least one functional component is further configured to store a second address set, where the second address set includes addresses of at least one forwarding component corresponding to the at least one to-be-accessed destination component; and the address or addresses of the at least one forwarding component include an address of the data routing component at an intersection on circular data paths to which the at least one functional component is coupled.

In the foregoing technical solution, the data transmitted by the functional component to the another circular data path may carry the address of the forwarding component corresponding to the destination component. In such a design, the data routing component corresponding to an address of a forwarding component carried in the data in data routing components coupled at intersections on circular data paths to which functional components are coupled, forwards the data to another circular data path.

In a possible design, the data further carries an address or addresses of at least one forwarding component corresponding to the destination component, and the address or addresses of the at least one forwarding component include an address of the data routing component at an intersection on circular data paths to which the at least one functional component is coupled; and the data routing component is further configured to: determine that one of the addresses of the at least one forwarding component carried in the data is consistent with the address of the data routing component, receive the data, and forward the data to another circular data path to which the data routing component is coupled.

In the foregoing technical solution, the data may further carry the address or addresses of at least one forwarding component corresponding to the destination component. The data routing component may determine whether the address of the data routing component is consistent with the address in the addresses of the forwarding component carried in the data. If the data routing component determines that one of the addresses of the forwarding component carried in the data is consistent with or the same as the address of the data routing component, the data routing component receives the data, and forwards the data to another circular data path to which the data routing component is coupled, so as to transmit data of the at least one functional component to the another circular data path.

According to a second aspect, this application provides a data transmission method, and the method may be applied to the interconnection system according to any one of the first aspect and the possible designs of the first aspect. For example, the interconnection system includes a plurality of circular data paths, where the plurality of circular data paths include at least one lateral circular data path and at least one longitudinal circular data path; a data routing component, correspondingly disposed at an intersection on the at least one lateral circular data path and the at least one longitudinal circular data path, where the data routing component is separately coupled to the corresponding lateral circular data path and the corresponding longitudinal circular data path; and at least one functional component, further coupled at a non-intersection on at least one of the at least one lateral circular data path and the at least one longitudinal circular data path. The method includes: The at least one functional component transmits generated data to a coupled circular data path; a data routing component coupled at an intersection on the coupled circular data path and another circular data path receives the data; and the data routing component forwards the received data to the another circular data path, so that a destination component receives the data.

In the foregoing technical solution, when transmitting the data to a destination component on another circular data path, the functional component may transmit the data to the circular data path to which the functional component is coupled. The data routing component coupled at the intersection on the circular data path to which the functional component is coupled and the another circular data path forwards the data sent by the functional component to the another circular data path, to implement data transmission between the functional component and the destination component. In addition, the data exchanged between the functional component and the destination component can be changed only once by changing the circular data path, and therefore simplify the data exchange process.

In a possible design, the data carries an address of a destination component. The destination component receives the data if determining that the address of the destination component carried in the data is consistent with an address of the destination component.

In the foregoing technical solution, the destination component may receive the data if the address of the destination component carried in the data is consistent with the address of the destination component, so that the destination component can receive the data transmitted by the functional component.

In a possible design, if the data routing component determines that the address of the destination component carried in the data is consistent with an address in a pre-stored first address set, the data routing component receives the data and forwards the received data to the another circular data path, where the first address set includes an address of another component coupled to the lateral circular data path corresponding to the data routing component and an address of another component coupled to the longitudinal circular data path corresponding to the data routing component.

In the foregoing technical solution, the data routing component may store the first address set in advance, where the first address set includes the address of the another component coupled to the lateral circular data path corresponding to the data routing component and the address of the another component coupled to the longitudinal circular data path corresponding to the data routing component. The address of the destination component carried in the data is consistent with an address in the first address set, and a circular data path to which a component corresponding to the consistent address is coupled is the another circular data path. The data routing component may transmit the data to the circular data path to which the component corresponding to the consistent address is coupled, so that the destination component may receive the data from the another circular data path.

In a possible design, the data further carries an address or addresses of at least one forwarding component; before the at least one functional component transmits the data to a coupled circular data path, the method further includes: The at least one functional component determines, according to a pre-stored second address set, an address of a forwarding component corresponding to a destination component coupled to the another circular data path, where the second address set includes an address of a forwarding component corresponding to at least one to-be-accessed destination component; and the forwarding component is a data routing component at an intersection on the circular data paths to which the at least one functional component is coupled and the another circular data path.

In the foregoing technical solution, the functional component may store the second address set in advance, where the second address set includes the address of the forwarding component corresponding to the to-be-accessed destination component, and the forwarding component is a component that forwards the data in a path through which the functional component transmits the data to the destination component. The data generated by the functional component carries the address of the forwarding component corresponding to the destination component, so that the data routing component corresponding to the address of the forwarding component in the data routing components at the intersections on the circular data paths to which the functional components are coupled may forward the data.

In a possible design, the data further carries an address or addresses of at least one forwarding component; the address or addresses of the at least one forwarding component include an address of the data routing component coupled at an intersection on the coupled circular data path and another circular data path; and if the data routing component coupled at the intersection on the coupled circular data path and the another circular data path determines that the address of the data routing component is consistent with one of the addresses of the at least one forwarding component, the data routing component receives the data and forwards the data to the another circular data path, so that the destination component receives the data.

In the foregoing technical solution, the data routing component at the intersection on the circular data paths to which the functional component is coupled may receive the data and forward the data after determining that the address of the data routing component is consistent with one of the addresses of the at least one forwarding component carried in the data. The data is forwarded to another circular data path to which the data routing component is coupled, so that the destination component can receive the data.

According to a third aspect, this application further provides a data transmission method. The method may be implemented by the data routing component in the interconnection system according to any one of the first aspect or the possible designs of the first aspect, and is applied to a scenario in which a data routing component with an access function interacts with another component. The method includes: A first data routing component transmits generated data to a coupled circular data path, where the first data routing component is one of a central processing unit CPU, a network interface controller NIC, and a peripheral component interconnect express PCIE. A second data routing component coupled at an intersection on the coupled circular data path and another circular data path receives the data. The second data routing component forwards the received data to the another circular data path. The destination component coupled to the another circular data path receives the data, the destination component is a functional component coupled at a non-intersection on the another circular data path, or the destination component is a third data routing component coupled at an intersection on the another circular data path.

In the foregoing technical solution, the data routing component with an access function, for example, a CPU, a MC, or a PCIE, may access another data routing component or functional component. The destination component accessed by the first data routing component may be coupled to another circular data path. Data exchanged between the first data routing component and the destination component may be forwarded, to another circular data path, by another data routing component on the circular data path to which the first data routing component is coupled, so that the destination component receives the data from the another circular data path.

In a possible design, the data carries an address of a destination component. The destination component receives the data if determining that the address of the destination component carried in the data is consistent with an address of the destination component.

In the foregoing technical solution, the data transmitted by the first data routing component to another circular data path may carry the address of the destination component. In such a design, the destination component can receive the data transmitted by the first data routing component.

In a possible design, before the second data routing component receives the data, the method further includes: The second data routing component determines that the address of the destination component carried in the data is consistent with one of the addresses of the other components coupled to the another circular data path in the pre-stored first address set; and the first address set includes an address of another component coupled to the lateral circular data path corresponding to the second data routing component, and an address of another component coupled to the longitudinal circular data path corresponding to the second data routing component.

In the foregoing technical solution, the second data routing component may determine that the address of the destination component carried in the data is the same as an address in the second address set, receive the data, and forward the data to a circular data path to which a component corresponding to the consistent address is coupled, so that a destination component coupled to another circular data path can receive that data from the another circular data path.

In a possible design, the data further carries an address or addresses of at least one forwarding component. Before the first data routing component transmits the data to the coupled circular data path, the method further includes: The first data routing component determines, according to a pre-stored second address set, an address of a forwarding component corresponding to a destination component coupled to the another circular data path, where the second address set includes an address of a forwarding component corresponding to at least one to-be-accessed destination component; and the forwarding component is a data routing component at an intersection on the circular data path to which the first data routing component is coupled and the another circular data path.

In the foregoing technical solution, the first data routing component may generate the data that carries the addresses of the at least one forwarding component. The first data routing component may determine, according to the second address set, the address of the forwarding component corresponding to the destination component. The first data routing component may generate the data that carries the address of the forwarding component, so that the data routing component corresponding to the address of the forwarding component carried in the data forwards the data.

In a possible design, the data further carries an address or addresses of at least one forwarding component. The second data routing component determines that one of the addresses of the at least one forwarding component carried in the data is consistent with an address of the second data routing component.

In the foregoing technical solution, the second data routing component may determine that the address of the forwarding component carried in the data is consistent with the address of the second data routing component, and forward the data to another circular data path to which the second data routing component is coupled, so that the destination component receives the data from the another circular data path.

According to a fourth aspect, this application provides a system on a chip SoC chip, and the SoC chip includes the interconnection system according to any one of the first aspect or the possible designs in the first aspect. The SoC chip may be integrated into an electronic device, and is used as a processor of the electronic device, to provide AI computing.

According to a fifth aspect, this application provides a chip system. The chip system may include one or more chips. The chip system may include the SoC chip according to any one of the fourth aspect or the possible designs in the fourth aspect.

According to a sixth aspect, this application provides an electronic device. The electronic device includes the interconnection system according to any one of the first aspect or the possible designs of the first aspect. The interconnection system may be coupled to modules in the electronic device, for example, a communications module or a camera module. The interconnection system may control each module in the electronic device to perform a related operation. Alternatively, the electronic device may include the SoC chip according to the fourth aspect. The SoC chip may be used as a processor of the electronic device to control each functional component to perform a related operation.

According to a seventh aspect, an embodiment of this application provides a computer-readable storage medium. The computer-readable storage medium includes a computer program, computer-readable instructions or code. When the computer program and the computer-readable instructions or code are executed on a processor, any one of the second aspect or the possible designs of the second aspect or any one of the third aspect or the possible designs of the third aspect is performed.

DESCRIPTION OF EMBODIMENTS

Figure 1:
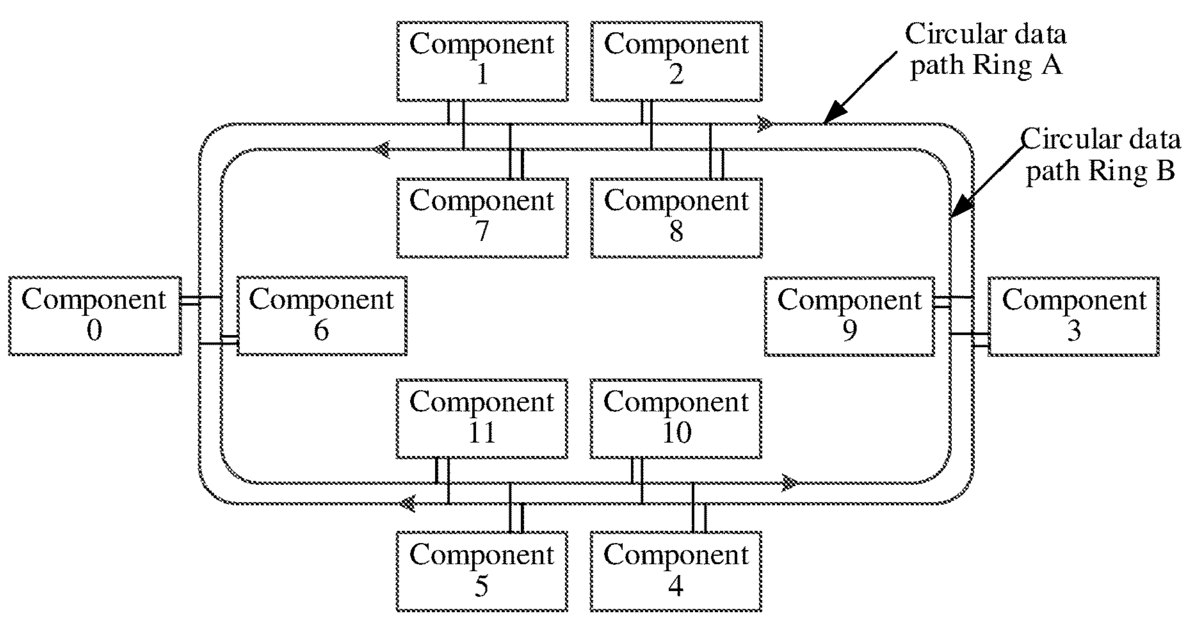
FIG. 1 is a schematic diagram of a ring topology structure.

Currently, commonly used NoC topology structures include a ring topology structure and a mesh topology structure. As shown in FIG. 1, the ring topology includes two circular data paths (Ring) with opposite data transmission directions, and there is no data exchange between the two rings. As shown in FIG. 1, the two rings are Ring A and Ring B. Components are evenly distributed on the outside of Ring A and on the inside of Ring B. Each component may separately exchange data with the connected Ring A and Ring B. The data exchange includes transmitting data to the ring and receiving data from the ring. Generally, each component determines to transmit data to one of the two rings according to a shortest path principle. However, if a quantity of components is increased, scale of the ring topology structure is increased accordingly, and there is a relatively large delay in communication between the components, which is difficult to apply to a large-scale on-chip interconnection scenario.

Figure 2:
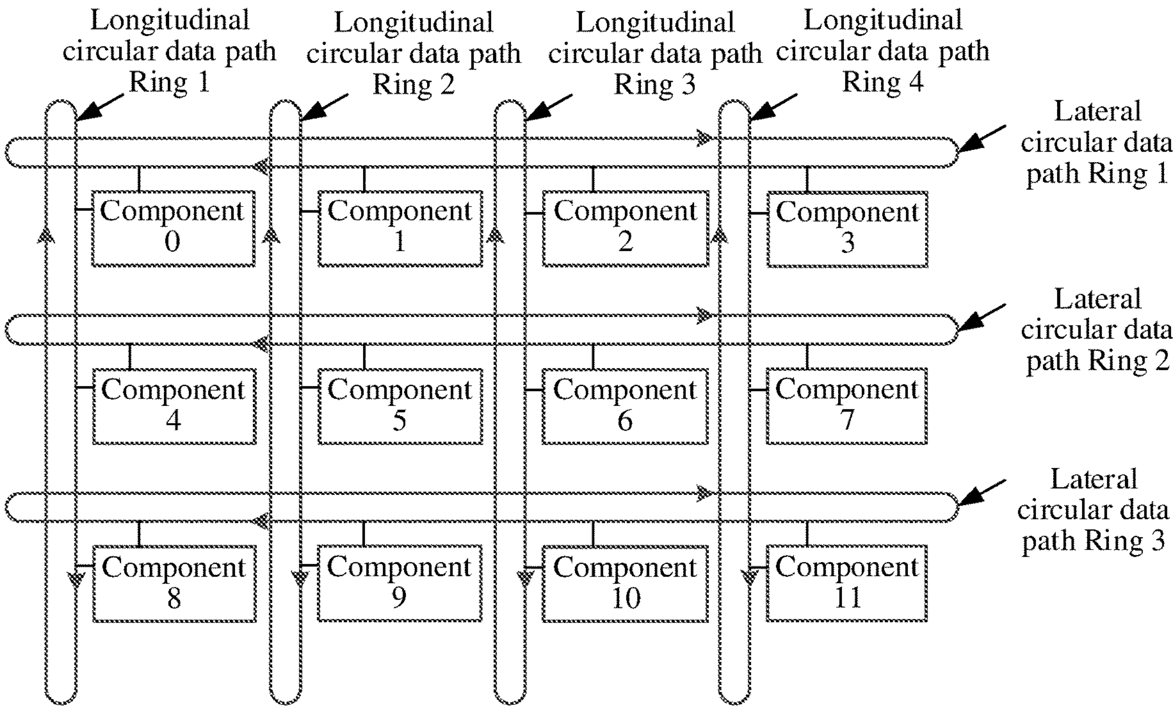
FIG. 2 is a schematic diagram of a mesh topology structure.
Figure 3:
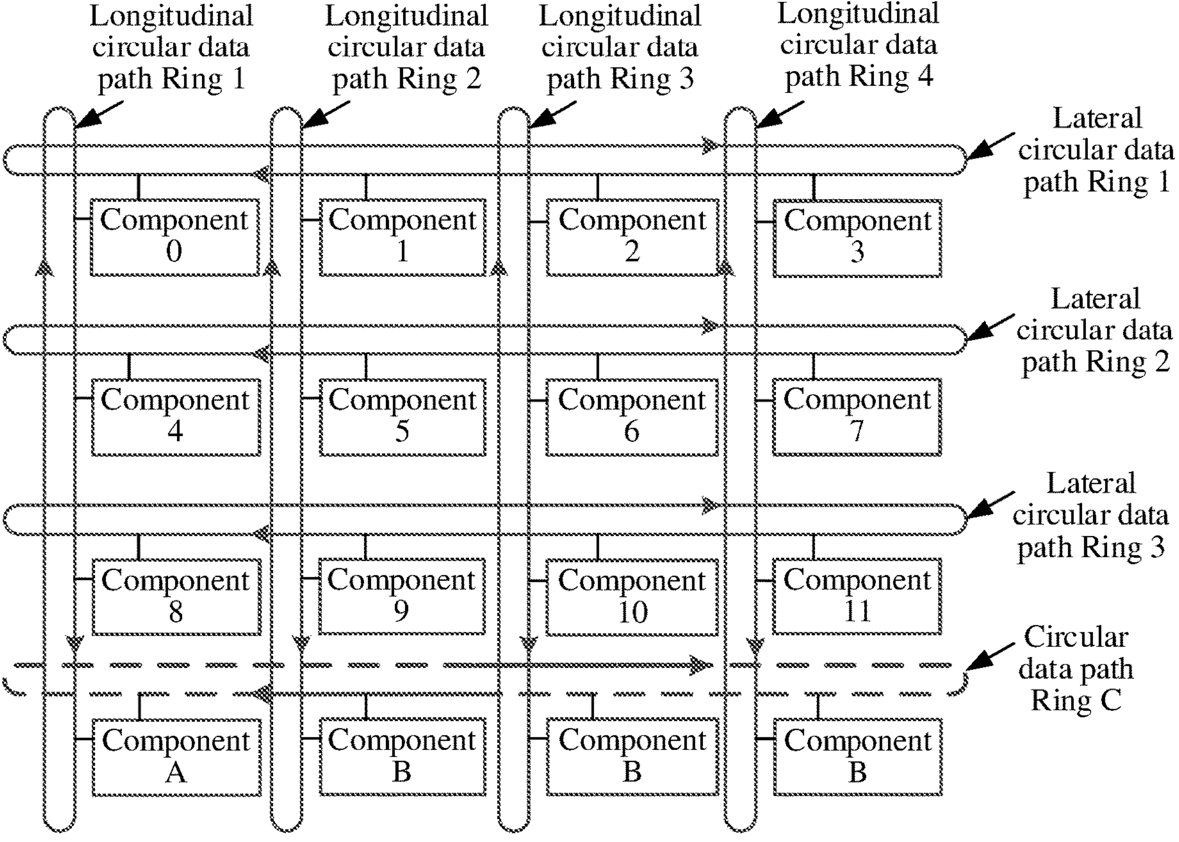
FIG. 3 is a schematic diagram of expanding a mesh topology structure.

As shown in FIG. 2, a mesh topology structure includes a plurality of rings, the plurality of rings are arranged to form a mesh, and components are separately disposed at intersections on lateral rings and longitudinal rings, and separately exchange data with the lateral rings and the longitudinal rings. Compared with the ring topology structure, in the mesh topology structure, there is a shorter communication delay between components when a quantity of components is increased. In the mesh topology structure shown in FIG. 2, data exchange is implemented between any two rings (a lateral ring and a longitudinal ring) through a data routing component disposed at an intersection on the lateral ring and the longitudinal ring. When new components are added to the mesh topology structure, costs of expanding the mesh topology structure are high. As shown in FIG. 3, when a component A is newly added to the mesh topology structure shown in FIG. 2, a lateral ring (Ring C) and a plurality of components B that are used to exchange data between Ring C and an existing longitudinal ring need to be added to the mesh topology structure. It can be learned that expansion costs are high when a new component is added. In addition, with the new component and ring, an area occupied by the mesh topology structure is increased, to cause a low area-efficiency ratio (system efficiency per unit area or performance improvement ratio).

In view of this, an embodiment of this application provides an interconnection system, to improve system performance per unit area of the interconnection system, with relatively good scalability and a relatively high area-efficiency ratio.

An embodiment of this application provides an interconnection system, which may be applied to, for example, an SoC chip in the AI field. The interconnection system may alternatively be integrated in a computer, a portable computer, a hand-held device (for example, a mobile phone or a tablet computer), a server, a virtual reality device, an augmented reality device, a mixed reality device, and the like. The interconnection system provided in this embodiment of this application may be used in a scenario in which a large amount of data needs to be processed, for example, processing an image, a video, or audio, or may be applied to an AI computing scenario.

In the following descriptions and/or claims, the terms "coupling" and/or "connection" and derivatives thereof may be used. In specific embodiments, "connection" may be used to mean that two or more elements are in direct physical and/or electrical contact with each other. "Coupling" may mean that two or more elements may not be in direct contact with each other, but may still cooperate and/or interact with each other. For example, "coupling" may mean that two or more elements are not in contact with each other, but are indirectly joined together via another element or an intermediate element. The following describes an interconnection system according to this embodiment of this application.

The interconnection system according to this embodiment of this application may include a plurality of circular data paths. The plurality of circular data paths include at least one lateral circular data path and at least one longitudinal circular data path. A data routing component is correspondingly disposed at an intersection on the at least one lateral circular data path and the at least one longitudinal circular data path, where the data routing component is separately coupled to the corresponding lateral circular data path and the corresponding longitudinal circular data path.

At least one functional component is further coupled at a non-intersection on at least one of the at least one lateral circular data path and the at least one longitudinal circular data path, where the at least one functional component is configured to transmit data to a destination component on another circular data path through a data routing component at an intersection on circular data paths to which the at least one functional component is coupled.

The "non-intersection" described in this specification means that a component (for example, a functional component) coupled at a non-intersection are coupled only to a corresponding lateral circular data path, or only to a corresponding longitudinal circular data path, rather than being coupled to both the lateral circular data path and the longitudinal data path at the intersection.

When exchanging data with a destination component connected to another circular data path, through a data routing component at an intersection on circular data paths to which the at least one functional component is coupled, the at least one functional component transmits data generated by the at least one functional component to the destination component on the another circular data path. The at least one functional component may also receive data on another circular data path through a data routing component at an intersection on the circular data paths to which the at least one functional component is coupled.

Figure 4:
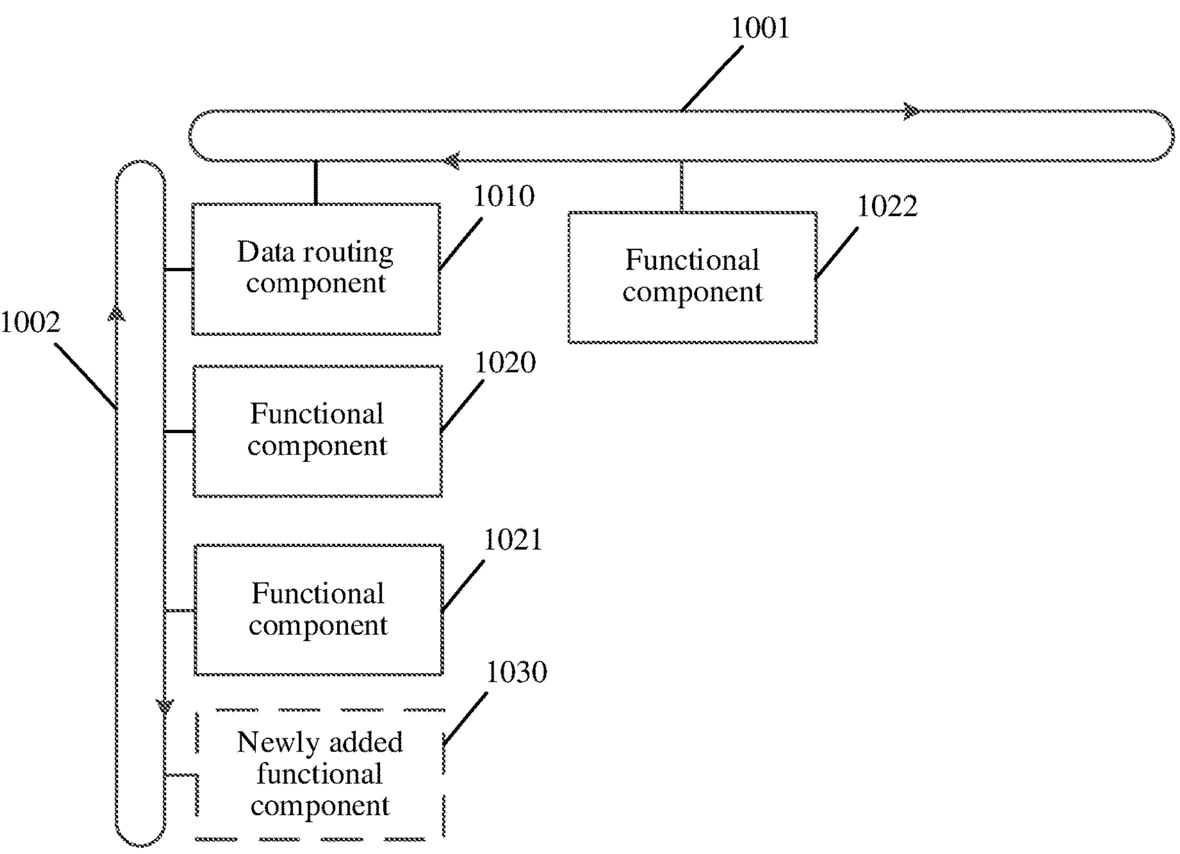
FIG. 4 is a schematic structural diagram of an interconnection system according to this application.

As shown in FIG. 4, the interconnection system includes a lateral circular data path 1001 and a longitudinal circular data path 1002. A data routing component 1010 is separately coupled to the corresponding lateral circular data path 1001 and the corresponding longitudinal circular data path 1002 at an intersection on the lateral circular data path 1001 and the longitudinal circular data path 1002. The data routing component 1010 may forward data on the lateral circular data path 1001 to the longitudinal circular data path 1002, or may forward data on the longitudinal circular data path 1002 to the lateral circular data path 1001. It may also be referred to as the data routing component 1010 having a capability or function of exchanging data between the lateral circular data path 1001 and the longitudinal circular data path 1002.

The interconnection system may also include at least one functional component coupled at a non-intersection on a corresponding circular data path. As shown in FIG. 4, the interconnection system may include three functional components coupled at non-intersections on the corresponding circular data path. For example, a functional component 1020 is coupled at a non-intersection on the longitudinal circular data path 1002, and a functional component 1021 is coupled at a non-intersection on the longitudinal circular data path 1002. A functional component 1022 is coupled at a non-intersection on the lateral circular data path 1001.

For ease of description, in two components that perform data transmission (data exchange), a component that transmits data may be denoted as a source component, and a component that receives the data may be denoted as a destination component. The functional component in the interconnection system located at the non-intersection on the circular data path may transmit data as a source component or receive data as a destination component. The functional component may transmit data to the circular data path to which the functional component is coupled, or may receive data through the circular data path to which the functional component is coupled. For example, when the functional component 1020 transmits the data to the functional component 1022, the functional component 1020 transmits the data to the longitudinal circular data path 1002. The data sent by the functional component 1020 to the longitudinal circular data path 1002 is forwarded by the data routing component 1010 to the lateral circular data path 1001. The functional component 1022 may receive the data from the lateral circular data path 1001.

When the interconnection system is expanded, for example, a new functional component is added, the newly added functional component can be coupled at the non-intersection on the circular data path. For example, the newly added functional component is coupled at the non-intersection on the lateral circular data path 1001, or the newly added functional component may be coupled at the non-intersection on the longitudinal ring input path 1002. As shown in FIG. 4, the newly added functional component 1030 may be coupled at the non-intersection on the longitudinal circular data path 1002, and the newly added functional component 1030 may transmit the data to the longitudinal circular data path 1002, or may receive the data from the longitudinal circular data path 1002. The data routing component 1010 may forward the data sent by the newly added functional component 1030 to the lateral circular data path 1001, so that the newly added functional component 1030 can communicate with a functional component coupled to the lateral circular data path 1001. It can be learned that, during expansion of the interconnection system provided in this embodiment of this application, no new circular data path or another component needs to be added, and expansion costs are relatively low. In addition, by using the new functional component, the area occupied by the interconnection system is not changed, and the area-efficiency ratio of the interconnection system is improved.

The interconnection system may include a plurality of circular data paths. The plurality of circular data paths include at least one lateral circular data path and at least one longitudinal circular data path. A data routing component is correspondingly disposed at an intersection on each lateral circular data path and each longitudinal circular data path. In other words, the data routing component is coupled to the corresponding lateral circular data path and the corresponding longitudinal circular data path. The data routing component may have a capacity or function to exchange data between the lateral circular data path and the longitudinal circular data path.

Figure 5:
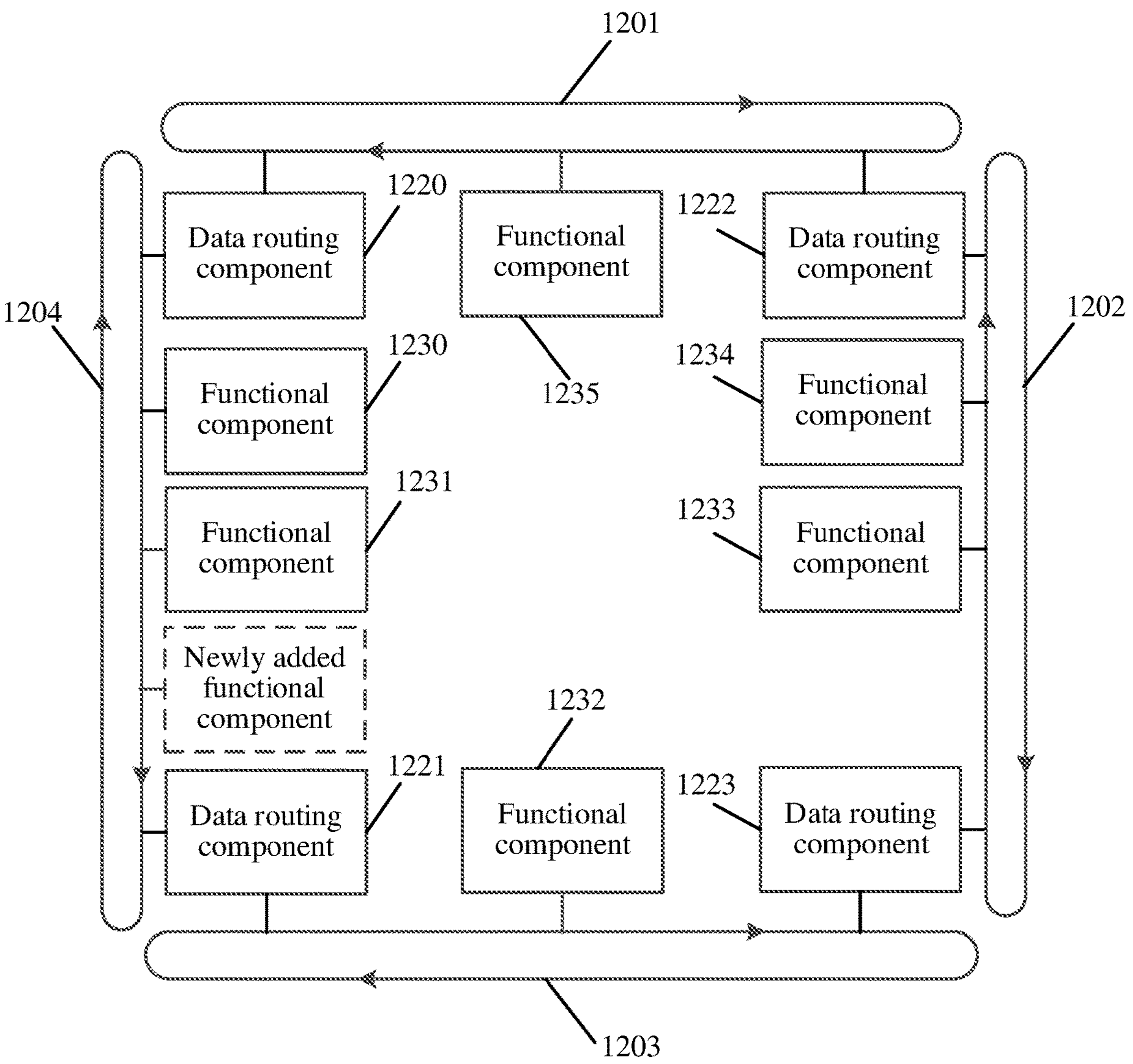
FIG. 5 is a schematic structural diagram of an interconnection system according to this application.

For example, as shown in FIG. 5, the interconnection system may include four circular data paths. The four circular data paths include two lateral circular data paths and two longitudinal circular data paths, namely, a lateral circular data path 1201, a lateral circular data path 1203, a longitudinal circular data path 1202, and a longitudinal circular data path 1204.

One data routing component is disposed at an intersection on the longitudinal circular data path 1204 and each of the two lateral circular data paths, that is, a data routing component 1220 and a data routing component 1221. For example, the data routing component 1221 is separately coupled to the corresponding lateral circular data path 1201 and the corresponding longitudinal circular data path 1204 at an intersection on the lateral circular data path 1201 and the longitudinal circular data path 1204. The data routing component 1221 is separately coupled to the corresponding lateral circular data path 1203 and the corresponding longitudinal circular data path 1204 at an intersection on the lateral circular data path 1203 and the longitudinal circular data path 1204. Similarly, the data routing component 1222 is separately coupled to the corresponding lateral circular data path 1201 and the corresponding longitudinal circular data path 1202 at an intersection on the lateral circular data path 1201 and the longitudinal circular data path 1202. The data routing component 1223 is separately coupled to the corresponding lateral circular data path 1203 and the corresponding longitudinal circular data path 1202 at an intersection on the lateral circular data path 1203 and the longitudinal circular data path 1202.

In this embodiment of this application, a quantity of functional components coupled at the non-intersection on each longitudinal circular data path may be the same or different. A quantity of functional components coupled at the non-intersection on each lateral circular data path may be the same or different. The quantity of functional components coupled at the non-intersection on each longitudinal circular data path may be the same as or different from the quantity of functional components coupled at the non-intersection on each lateral circular data path.

As shown in FIG. 5, a functional component 1230 and a functional component 1231 are separately coupled at non-intersections on the longitudinal circular data path 1204. A functional component 1235 is coupled at a non-intersection on the lateral circular data path 1201. A functional component 1233 and a functional component 1234 are separately coupled at non-intersections on the longitudinal circular data path 1202. A functional component 1232 is coupled at a non-intersection on the lateral circular data path 1203. It can be learned that the quantity of functional components coupled at the non-intersection on each longitudinal circular data path is the same, and a quantity of functional components coupled at the non-intersection on each lateral circular data path is the same.

When the interconnection system is expanded, for example, a functional component is added, the newly added functional component may be coupled at the non-intersection on the longitudinal circular data path 1204 as shown in FIG. 5. The newly added functional component may be directly coupled at the non-intersection on the longitudinal circular data path 1204, without adding a data routing component or a circular data path. When the interconnection system is expanded, by using the newly added functional component, the area occupied by the interconnection system is not increased. Therefore, the interconnection system is expanded, and the area-efficiency ratio of the interconnection system is improved.

In an actual application scenario, the interconnection system may include a plurality of functional components coupled at a plurality of non-intersections on a first circular data path in the plurality of circular data paths, and the first circular data path may be any one of the plurality of circular data paths. The plurality of functional components may be arranged on two sides of the first circular data path. In other words, the functional components that are separately coupled at a plurality of non-intersections on a circular data path may be arranged on two sides of the circular data path. In such a design, there is a large quantity of coupled functional components on the longitudinal circular data path 1204, so that a bandwidth obtained by each functional component is limited, and an overall data transmission delay of the longitudinal circular data path 1204 becomes larger. Alternatively, the plurality of functional components are arranged on a same side of the first circular data path. In other words, a plurality of functional components separately coupled at non-intersections on a circular data path may be arranged on a same side of the circular data path. As shown in FIG. 5, two functional components (for example, the functional component 1230 and the functional component 1231) coupled at the non-intersections on the longitudinal circular data path 1204 are arranged on a side of the longitudinal circular data path 1204 that is close to the longitudinal circular data path 1202. By using the functional component coupled to the circular data path, a large bandwidth can be obtained, and a data transmission delay can be reduced.

In this embodiment of this application, the functional component may include at least one of a computing component and a storage component. For example, the functional component includes only a computing component, or the functional component includes only a storage component, or the functional component may include both a computing component and a storage component. The computing component is configured to process a computing task. For example, the computing component is a component that has a data computing capability, for example, a neural network processing unit (NPU), a central processing unit (CPU), or a graphics processing unit (GPU). The storage component is configured to process a storage task. For example, the storage component is a component that stores data or provides a stored data capability. The storage component may be a memory (MEM). The MEM may be any type of embedded memory, for example, a device such as a dynamic random access memory (DRAM), a static random access memory (SRAM), or a non-volatile memory.

A plurality of functional components in an interconnection system located at non-intersections on a circular data path may include at least one computing component and at least one storage component. The computing component and the storage component are coupled to different types of circular data paths (for example, a lateral circular data path or a longitudinal circular data path). The interconnection system provided in this embodiment of this application may also be referred to as a multi-ring interconnection structure.

Figure 6:
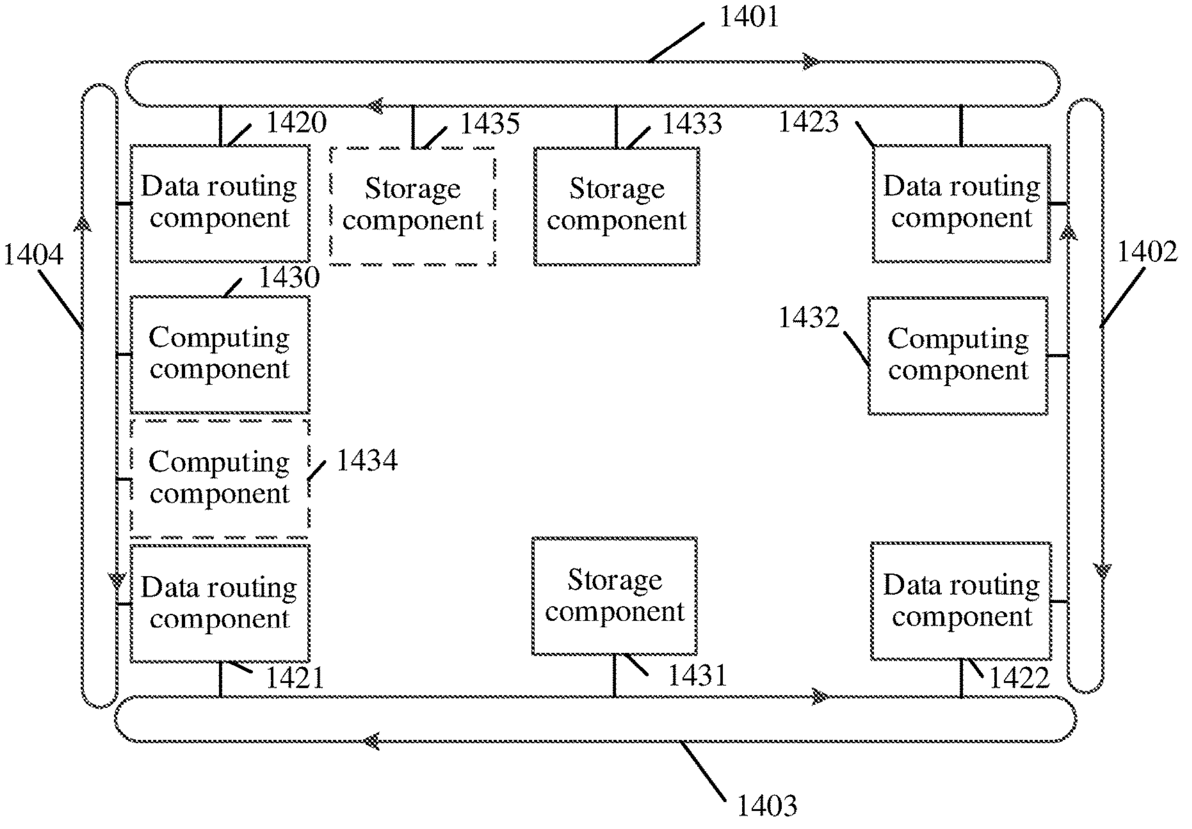
FIG. 6 is a schematic structural diagram of an interconnection system according to this application.

In one example, each of the at least one computing component is coupled to a corresponding longitudinal circular data path, and each of the at least one storage component is coupled to a corresponding lateral circular data path. In other words, the computing component is disposed at a non-intersection on the longitudinal circular data path, and the storage component is disposed at a non-intersection on the lateral circular data path. As shown in FIG. 6, each of the storage components (for example, a storage component 1431, a storage component 1433, and a storage component 1435) is coupled at a non-intersection on the lateral circular data paths (for example, a lateral circular data path 1401 and a lateral circular data path 1403). Each of the computing components (for example, a computing component 1430, a computing component 1432, and a computing component 1434) is coupled at a non-intersection on the longitudinal circular data paths (for example, a longitudinal circular data path 1402 and a longitudinal circular data path 1404).

In another example, each computing component is coupled at a non-intersection on a lateral circular data path, and each storage component is coupled at a non-intersection on a longitudinal circular data path.

When the interconnection structure is expanded, for example, a computing component is added, a connection point may be added to a non-intersection on any longitudinal circular data path, so that the newly added computing component can be connected to the interconnection structure. As shown in FIG. 6, a newly added computing component 1434 is coupled to the longitudinal circular data path 1404 at a non-intersection on the longitudinal circular data path 1404. For another example, a storage component is added, a connection point (or a coupling point) may be added to a non-intersection on any lateral circular data path, so that the newly added storage component can be connected to the interconnection structure. For example, a newly added storage component 1435 is coupled to the lateral circular data path 1401 at a non-intersection on the lateral circular data path 1401. When a new functional component is added, an access point may be added to a non-intersection on a corresponding type of circular data path, and there is no need to add one or more circular data paths or several data routing components as in the mesh interconnection structure (Mesh structure) shown in FIG. 2.

Figure 7:
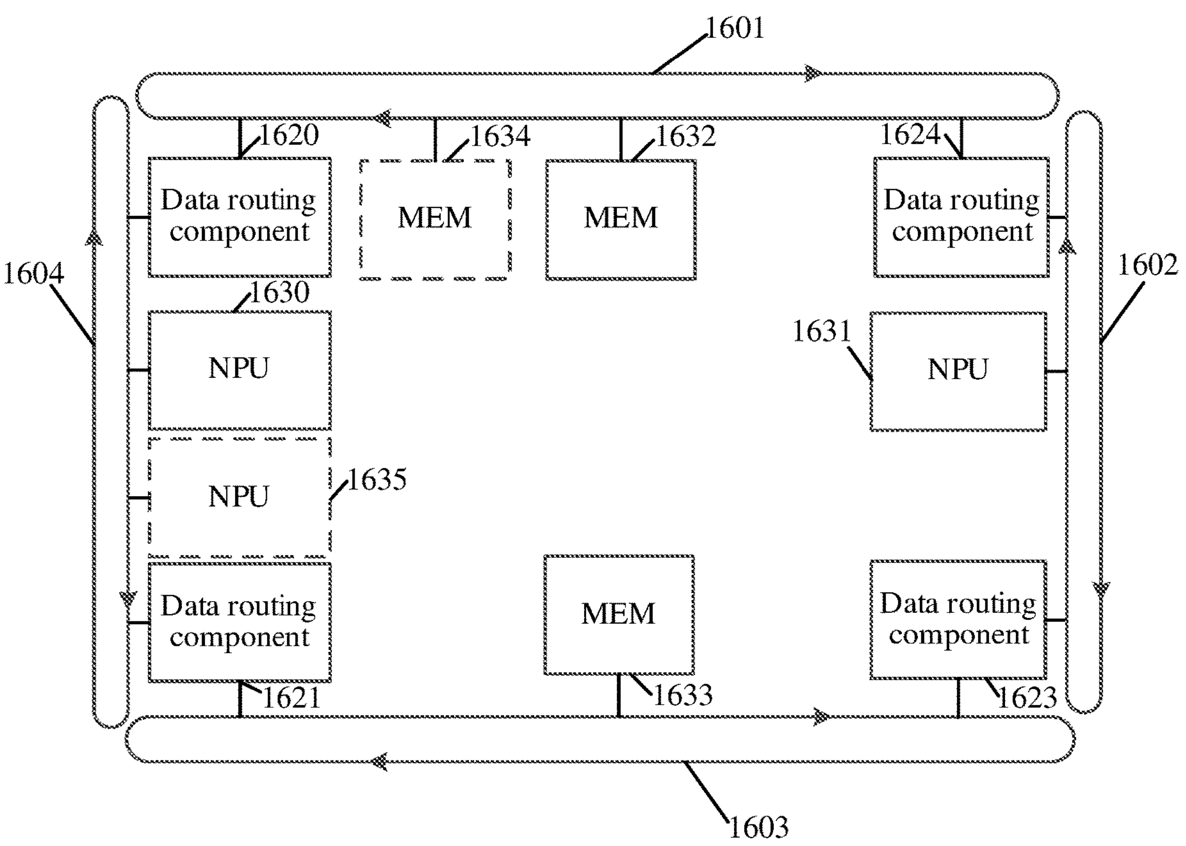
FIG. 7 is a schematic structural diagram of an interconnection system according to this application.

Optionally, the computing component may be an NPU, and the storage component may be a MEM, as shown in FIG. 7. As shown in FIG. 7, computing components, such as NPUs, are coupled at non-intersections on the longitudinal circular data paths, and storage components, such as MEMS, are coupled at non-intersections on the lateral circular data paths. For example, an NPU 1630 is coupled at a non-intersection on a longitudinal circular data path 1604 and an NPU 1631 is coupled at a non-intersection on a longitudinal circular data path 1602. A MEM 1632 is coupled at a non-intersection on a lateral circular data path 1601 and a MEM 1633 is coupled at a non-intersection on a lateral circular data path 1603. When the interconnection system is expanded, a newly added NPU 1635 may be coupled at a non-intersection on the longitudinal circular data path 1604. A newly added MEM 1634 may be coupled at a non-intersection on the lateral circular data path 1601. Generally, there is no data exchange between NPUs, and there is no data exchange between MEMs. A plurality of functional components coupled to a circular data path are all NPUs or all MEMs. Data sent by each functional component to the circular data path may be continuously transmitted to a data routing component coupled to the circular data path.

In such a design, when any NPU accesses any MEM, data exchanged between the NPU and the MEM needs to be forwarded once only through a corresponding data routing component at an intersection on the lateral circular data path to which the NPU is coupled and the longitudinal circular data path to which the MEM is coupled. That is, only one ring is required to be changed, and therefore the complexity of mutual access between the components can be reduced. In addition, there is no data exchange between functional components coupled at non-intersections on a circular data path, and data on the circular data path is data transmitted to another circular data path, or data sent from another circular data path. The complexity of data exchange on the circular data path is reduced.

In this embodiment of this application, data transmission directions on the plurality of circular data paths may be the same. For example, transmission of the plurality of circular data paths may be in a clockwise direction, or transmission of the plurality of circular data paths may be in a counter-clockwise direction. All data transmission on the circular data path shown in FIG. 4 are in a clockwise direction. The data transmission directions on the plurality of circular data paths may alternatively be different, and a data transmission direction on each circular data path may be determined according to an actual application scenario.

In this embodiment of this application, the data on the circular data path may be transmitted in various data transmission manners known in the art, provided that various components on a network-on-chip can transmit and/or receive data on the circular data path.

In an interconnection system, a corresponding data routing component is disposed at an intersection on each lateral circular data path and each longitudinal circular data path, where the data routing component may be configured to exchange data between the lateral circular data path and the longitudinal circular data path corresponding to the data routing component. The data routing component may be a ring bridge (RBRG), or may be various components used for routing or forwarding data in various ring interconnection architectures of a network-on-chip known in the art, for example, a proxy or a ring station. The RBRG may include service logic for routing, buffering, transmitting, managing data received and transmitted from the lateral circular data path, and managing data received and transmitted from the longitudinal circular data path. The RBRG may include a buffer, and the buffer is used to forward a data packet from one circular data path to another circular data path. Generally, a component with an active access function does not actively access the RBRG. The component with an active access function may be a component with an active access function or capability, for example, a functional component located at a non-intersection on the circular data path, or a data routing component with an access function located at an intersection on the circular data path.

Alternatively, the data routing component may be a module (for example, a connector having a PCIE port) that complies with a peripheral component interconnect express (PCIE) standard, a network interface controller (NIC), a CPU, or the like. The data routing component may exchange data between a lateral circular data path and a longitudinal circular data path corresponding to the data routing component, and may further have an active access function or capability, and may be referred to as a data routing component with an access function. The data routing component may integrate the RBRG in the foregoing embodiment. Thus, the data routing component may include service logic for routing, buffering, transmitting, managing data received and transmitted from the lateral circular data path, and managing data received and transmitted from the longitudinal circular data path. The data routing component may also include a buffer, and may further include other service logic, for example, service logic related to initiating access to another component, or for example, service logic related to initiating data read/write access.

The following describes a process in which a data routing component exchanges data between a lateral circular data path and a longitudinal data path.

Figure 8:
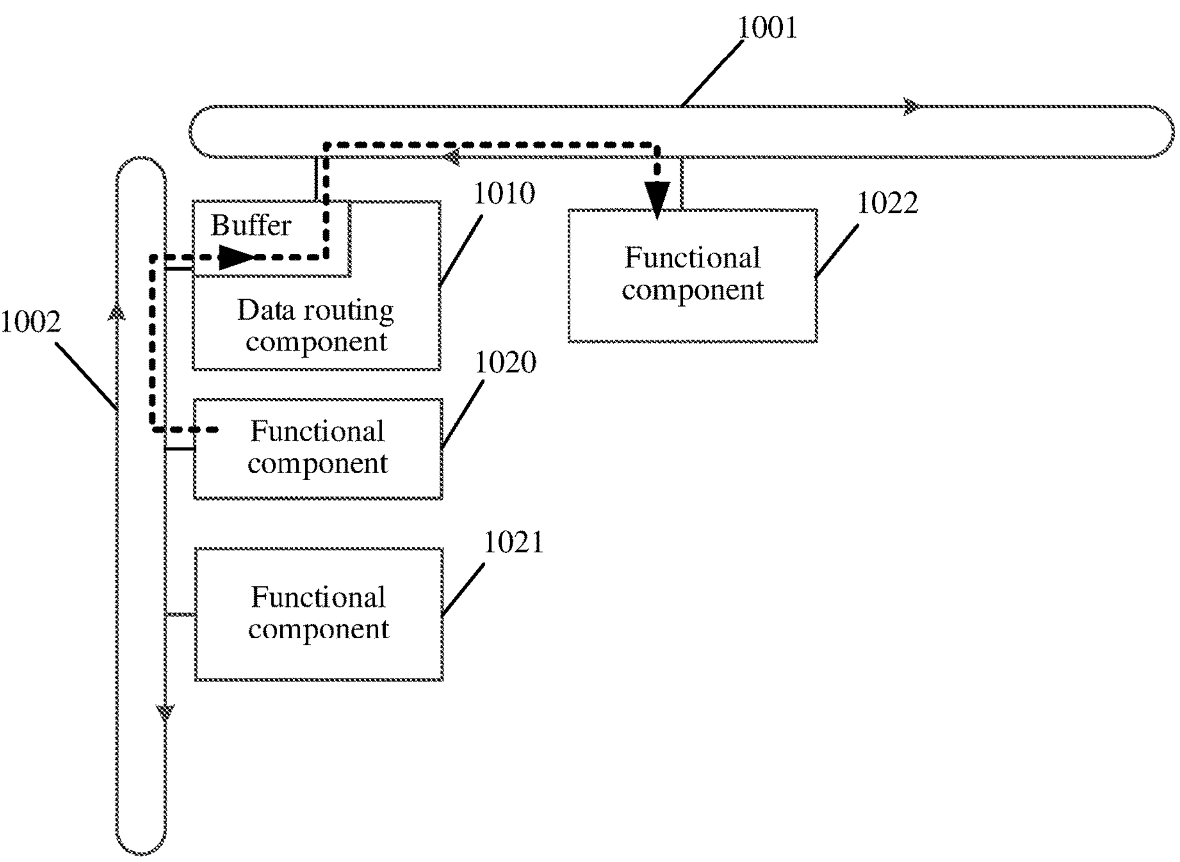
FIG. 8 is a schematic diagram of a data transmission process of an interconnection system according to this application.

In an embodiment, as shown in FIG. 8, a functional component 1020 coupled at a non-intersection on a longitudinal circular data path 1002 serves as a source component to transmit data to a destination component (for example, a functional component 1022) through a data routing component 1010. For example, the functional component 1020 transmits data A. The functional component 1020 may transmit the data A to the longitudinal circular data path 1002. The data routing component 1010 may receive the data A from the longitudinal circular data path 1002, and store the data A in a buffer inside the data routing component 1010. The data routing component 1010 may fetch the data A from the buffer, and forward the data A to the lateral circular data path 1001. The functional component 1022 may receive the data A from the lateral circular data path 1001.

When a data routing component with an active access function located at an intersection on circular data paths in an interconnection system, as a source component, accesses another component, the data routing component may transmit the generated data to the lateral circular data path to which the data routing component is coupled. Alternatively, the data routing component may transmit the generated data to the longitudinal circular data path to which the data routing component is coupled. In other words, during active access, the data routing component may transmit the generated data to a circular data path of a preset type (for example, lateral or longitudinal). For example, when accessing another component, the data routing component with the active access function located at the intersection on the circular data paths may first transmit, by default, the generated data to the lateral circular data path corresponding to the data routing component, or first transmit, by default, the generated data to the longitudinal circular data path corresponding to the data routing component. In such a design, the complexity of data communication in the interconnection system can be reduced.

In an actual SoC application scenario, a CPU may exchange data with a component with an active access function. For example, the data may be exchanged between CPUs. The CPU may also exchange the data with a NIC and a PCIE. The CPU may exchange the data with a MEM. The CPU may also exchange the data with an NPU.

The NIC may exchange the data with a component with an active access function. For example, the data may be exchanged between the NIC and the CPU. The data may also be exchanged between the NIC and the PCIE. The NIC may exchange the data with the NPU. The NIC may also exchange the data with the MEM.

The PCIE may also exchange the data with a component with an active access function. For example, the data may be exchanged between the PCIE and the CPU. The data may also be exchanged between the PCIE and the NIC. For example, the PCIE may exchange the data with the NPU. The PCIE may also exchange the data with the MEM.

A plurality of circular data paths in the interconnection system provided in this embodiment of this application may be arranged in a mesh. In the interconnection system shown in FIG. 5 to FIG. 7, a plurality of circular data paths are arranged in a mesh. A mesh may be formed by a plurality of circular data paths included in the interconnection system. At least one functional component included in the interconnection system may be arranged in the mesh. The mesh formed by the plurality of circular data paths may be polygonal. Generally, in an actual application scenario, when the plurality of circular data paths are arranged in a mesh, the mesh may be in a rectangle shape.

Figure 9:
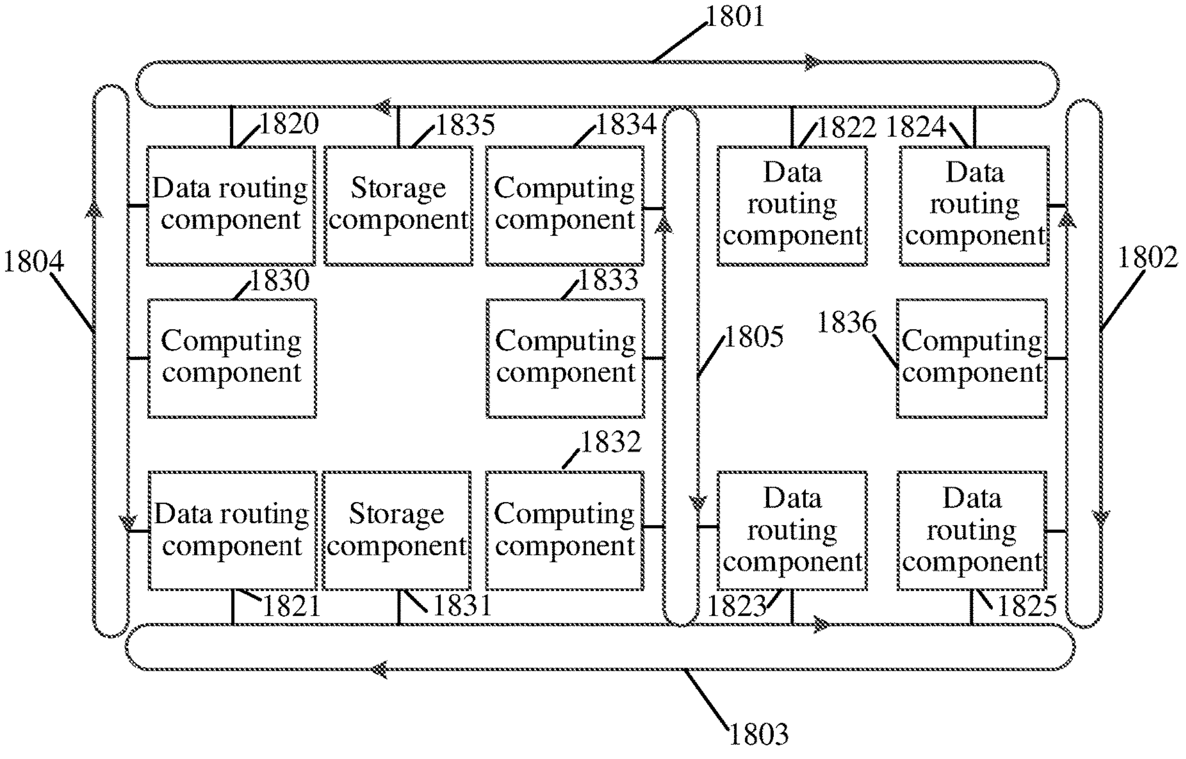
FIG. 9 is a schematic structural diagram of still another interconnection system according to this application.

In an implementation, a plurality of circular data paths are arranged in a mesh, and a plurality of meshes may be formed. As shown in FIG. 9, the interconnection system may include N circular data paths. The N circular data paths are arranged in a mesh, and a plurality of meshes may be formed. Functional components in an interconnection system can be flexibly arranged in different meshes. FIG. 9 shows an interconnection system including 5 (N=5) circular data paths, forming two meshes. The interconnection system may include two lateral circular data paths, respectively denoted as a lateral circular data path 1801 and a lateral circular data path 1803. The interconnection system may further include three longitudinal circular data paths, respectively denoted as a longitudinal circular data path 1802, a longitudinal circular data path 1804, and a longitudinal circular data path 1805. A data routing component is correspondingly disposed at an intersection on each lateral circular data path and each longitudinal circular data path. For example, a data routing component 1822 is correspondingly disposed at an intersection on the lateral circular data path 1801 and the longitudinal circular data path 1805, and the data routing component 1822 is configured to exchange data between the lateral circular data path 1801 and the longitudinal circular data path 1805. In the interconnection system shown in FIG. 9, a functional component is coupled at a non-intersection on each circular data path. A functional component coupled at a non-intersection on the longitudinal circular data path is a computing component, and a functional component coupled at a non-intersection on the lateral circular data path is a storage component. A computing component 1830 is coupled at a non-intersection on the longitudinal circular data path 1804, and a computing component 1834, a computing component 1833, and a computing component 1832 are respectively coupled at non-intersections on the longitudinal circular data path 1805. A computing component 1836 is coupled at a non-intersection on the longitudinal circular data path 1802. A storage component 1835 is coupled at a non-intersection on the lateral circular data path 1801 and a storage component 1831 is coupled at a non-intersection on the lateral circular data path 1803.

It should be understood that, the simplified example shown in FIG. 5 to FIG. 9 is merely an example of a plane view of an interconnection system including a plurality of circular data paths arranged in a mesh, and that a wide range of alternative designs with more or fewer functional components or different placements of circular data paths may be provided.

In this embodiment of this application, a source component (for example, a component with an active access function) may store an address of a component accessed by the source component. In this embodiment of this application, the address of the component may be used to represent the component, and there is a unique correspondence between the address and the component. According to some embodiments, the address of the component may be a component number, a component identifier, a component mark, and the like that are commonly used in this field to indicate a component address. The following uses the component identifier as an example for description.

When the source component accesses a destination component, the source component may generate data that carries an identifier of the destination component. In this embodiment of this application, the data may be a data packet, a data frame, a service, a message, an instruction, or the like.

The following uses an example in which a functional component located at a non-intersection on a corresponding circular data path is used as a source component to access a destination component (for example, a functional component located at a non-intersection on another corresponding circular data path) for description.

Figure 10:
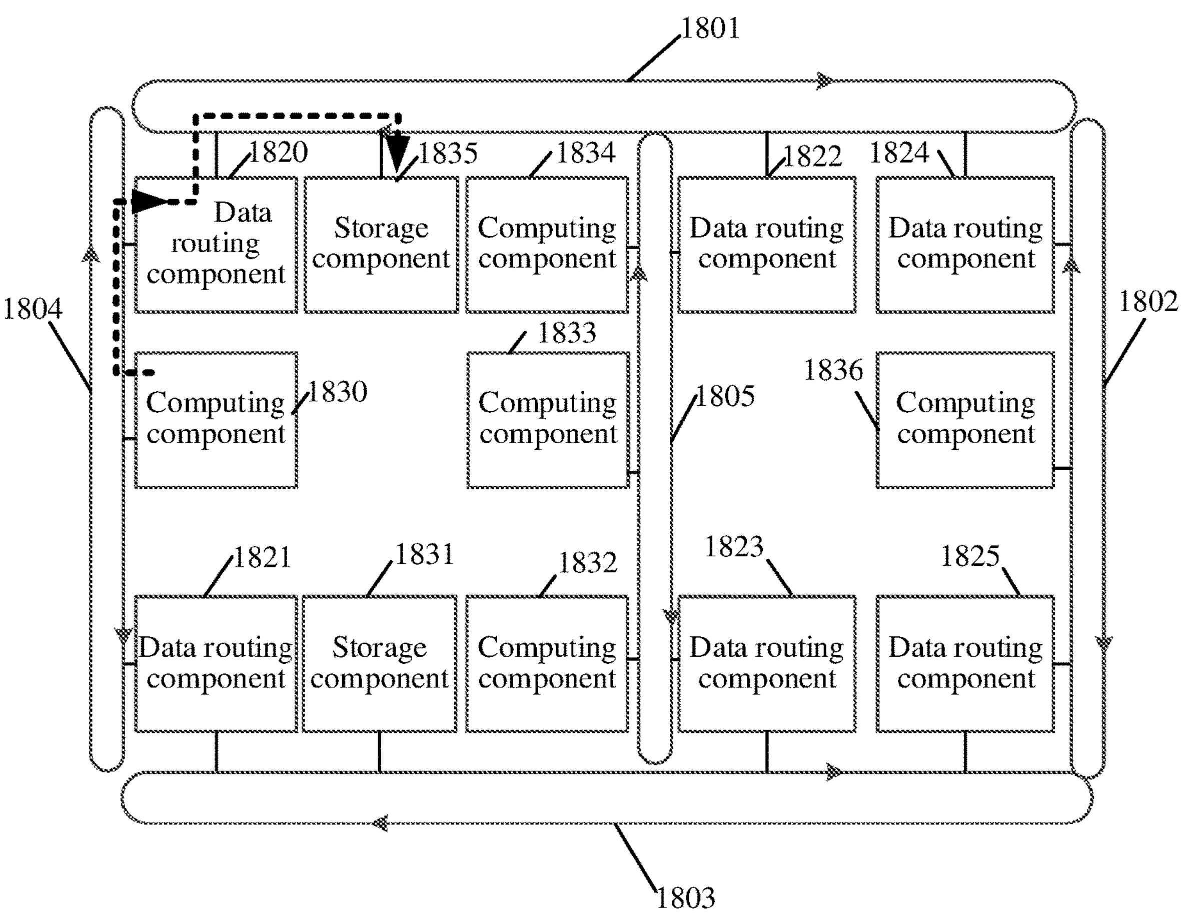
FIG. 10 is a schematic diagram of a data transmission process of an interconnection system according to this application.

In the example in FIG. 10, the computing component 1830 may exchange data with the storage component 1835. When the computing component 1830 as a source component accesses a destination component (for example, the storage component 1835), the computing component 1830 may generate data B that carries an identifier of the destination component as an identifier of the storage component 1835, and transmit (inject) the data B to the coupled longitudinal circular data path 1804.

In a possible design, a data routing component located at an intersection on corresponding circular data paths may store a first address set. The first address set includes an identifier of another component coupled to a lateral circular data path corresponding to the data routing component and an identifier of another component coupled to a longitudinal circular data path corresponding to the data routing component. The data routing component may determine that the identifier of the destination component carried in the data is consistent with an identifier in the first address set, receive the data, and forward the data to a circular data path to which a component corresponding to the consistent identifier is coupled.

For example, the first address set stored in the data routing component 1820 includes an identifier of another component coupled to the lateral circular data path 1801 and an identifier of another component coupled to the longitudinal circular data path 1804. The data routing component 1820 may determine whether the identifier of the destination component carried in the data B is consistent with the identifier in the stored first address set. The data routing component 1820 may determine that the identifier of the destination component carried in the data B is consistent with an identifier m in the first address set (a component corresponding to the identifier m is the storage component 1835), receive the data B from the longitudinal ring digital path 1804, and store the data B in a buffer inside the data routing component 1820. The data routing component 1820 fetches the data B from the buffer and forwards (forwards and routes) the data B to the lateral circular data path 1801 coupled to the component corresponding to the identifier m, so that the storage component 1835 receives the data B.

A component coupled to the lateral circular data path 1801 may detect whether the identifier of the destination component carried in the data B on the lateral circular data path 1801 is consistent with an identifier of the component. If the storage component 1835 may determine that the identifier of the destination component carried in the data B is consistent with the identifier of the storage component 1835, the storage component 1835 receives the data B.

In another possible design, the source component may further store a second address set, where the second address set includes identifiers of at least one forwarding component corresponding to at least one to-be-accessed destination component, and the forwarding component is at least one component that forwards the data on a path through which a source component transmits data to a destination component. For example, the forwarding component may include a data routing component at an intersection on the circular data path to which the at least one functional component is coupled and another circular data path, for forwarding the data on the path. When the source component accesses the destination component, the source component may generate the data that carries the identifier of the destination component and the identifier of the forwarding component corresponding to the destination component.

For example, the computing component 1830 may prestore a second address set, where the second address set includes identifiers of at least one forwarding component corresponding to an identifier of a to-be-accessed destination component. For example, an identifier of the forwarding corresponding to the storage component 1835 is the identifier of the data routing component 1820. When the computing component 1830 accesses the storage component 1835, the computing component 1830 may determine, according to the stored second address set, that the identifier of the forwarding component corresponding to the storage component 1835 is the identifier of the data routing component 1820. The computing component 1830 may generate data C carrying the identifier of the destination component as the identifier of the storage component 1835 and the identifier of the forwarding component as the identifier of the data routing component 1820, and transmit (inject) the data C to the coupled longitudinal circular data path 1804.

The data routing component located at the intersection on corresponding circular data paths may determine that one of the addresses of the at least one forwarding component carried in the data is consistent with the address of the data routing component, receive the data, and forward the data to another circular data path.

For example, the data routing component 1820 may determine that one of the identifiers of the at least one forwarding component carried in the data C is consistent with the identifier of the data routing component 1820, receive the data C on the longitudinal circular data path 1804, and store the data C in the buffer inside the data routing component 1820. The data routing component 1820 fetches the data C from the buffer and forwards (forwards and routes) the data C to the lateral circular data path 1801.

Before fetching the data C from the buffer and forwarding the data C to the lateral circular data path 1801, the data routing component 1820 may monitor the lateral circular data path 1801. If it is determined that the lateral circular data path 1801 is idle, the data C is forwarded to the lateral circular data path 1801. By way of example only, the data routing component 1820 may implement data forwarding of a data packet between a lateral data path and a longitudinal data path in another way known in the art.

A component coupled to the lateral circular data path 1801 may detect whether the identifier of the destination component carried in the data C on the lateral circular data path 1801 is consistent with an identifier of the component. If the storage component 1835 may determine that the identifier of the destination component carried in the data C is consistent with the identifier of the storage component 1835, the storage component 1835 receives the data C.

In another embodiment of this application, the source component may alternatively be a data routing component with an access function located at an intersection on circular data paths. The data routing component with an access function as a source component may be a CPU, a PCIE, a NIC, or the like. The following uses an example in which a data routing component with an access function located at an intersection on circular data paths is used as a source component to access a destination component.

Figure 11:
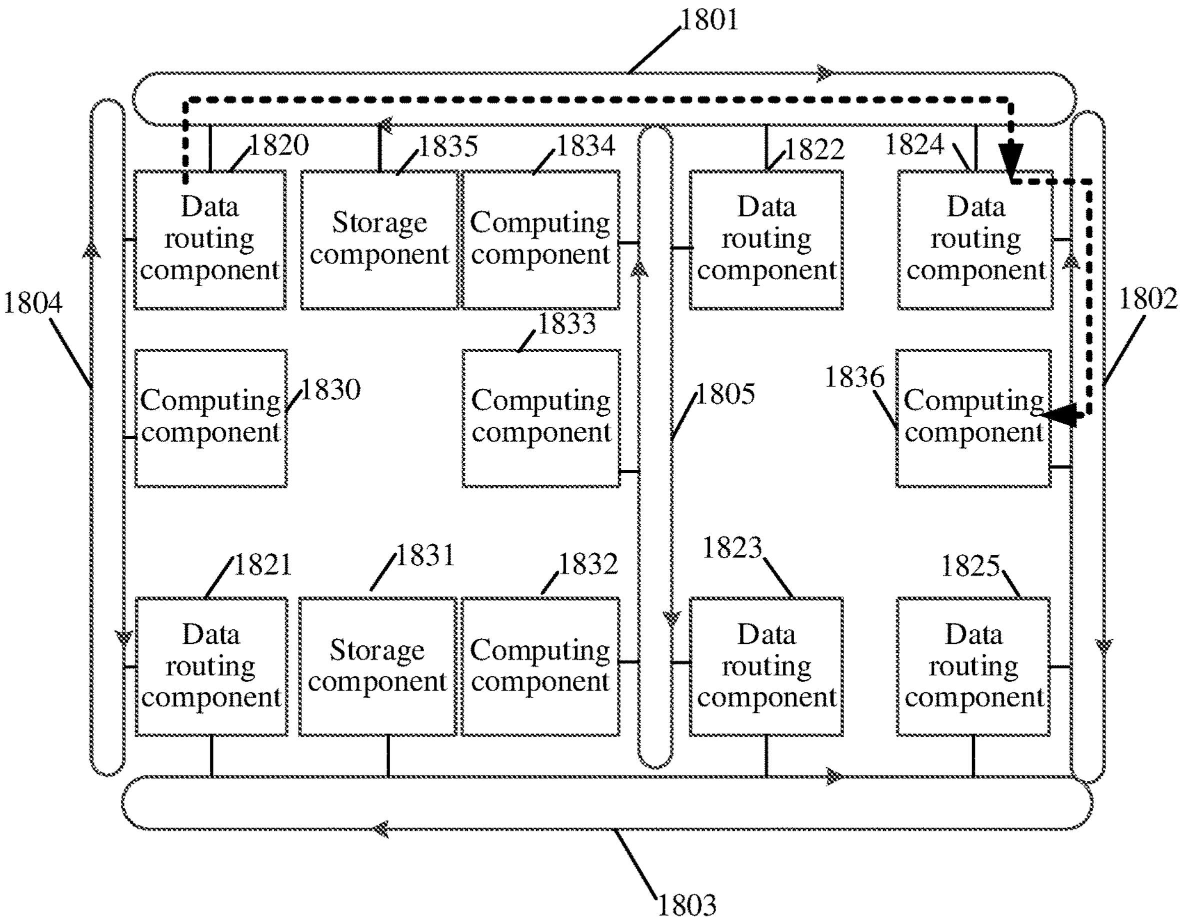
FIG. 11 is a schematic diagram of a data transmission process of an interconnection system according to this application.

In the example in FIG. 11, when a data routing component 1820 as a source component accesses a destination component (for example, a computing component 1836), the data routing component 1820 may generate data D. The data D may carry an identifier of the destination component, for example, carries an identifier of a computing component 1836. In this embodiment of this application, the data routing component with the access function may transmit the data D generated by the data routing component to a lateral circular data path to which the data routing component is coupled, or transmit the data D generated by the data routing component to a longitudinal circular data path to which the data routing component is coupled. In other words, the data routing component may transmit, according to a preset transmission rule, the generated data to the circular data path corresponding to a preset type.

When the data routing component with the access function as a source component exchanges the data with the destination component, the data routing component with the access function may determine, according to a stored first address set, that the identifier of the destination component is inconsistent with an identifier in the first address set, and determine that the destination component is coupled to another circular data path (that is, a circular data path that is different from the corresponding lateral circular data path and the corresponding longitudinal circular data path to which the destination component is coupled). Then, the data routing component may preferentially transmit the data sent to the destination component to the circular data path corresponding to the preset type. For example, the data routing component 1820 may determine that the identifier of the computing component 1836 is inconsistent with an identifier in the first address set stored in the data routing component 1820, and determine that the computing component 1836 is not a component coupled to the corresponding lateral circular data path 1801 and the corresponding longitudinal circular data path 1804 to which the data routing component 1820 is coupled. The data routing component 1820 may preferentially transmit the data D to the preset lateral circular data path 1801.

The data routing component with the access function may also store correspondences between types of various functional components (for example, a computing component NPU and a storage component MEM) and types of circular data paths (a lateral circular data path or a longitudinal circular data path) in advance. For example, a component (for example, an NPU) of a type of a computing component is coupled to a longitudinal circular data path, and a component (for example, a MEM) of a type of a storage component is coupled to a lateral circular data path. Alternatively, the data routing component with the access function may also store information about each component in advance, for example, an identifier and a type of the component. Alternatively, the data routing component may store an identifier of a component coupled to each circular data path in advance.

When the data routing component with the access function accesses the destination component, and determines that the identifier of the destination component is inconsistent with the identifier in the first address set, the data routing component with the access function may store information about each component in advance, and determine that a component type of a component corresponding to the identifier of the destination component is a computing component (for example, an NPU). The data routing component with the access function may further determine, according to the pre-stored correspondences between the types of various components and the types of the circular data paths, that a functional component whose component type is a computing component (for example, an NPU) is connected to the longitudinal circular data path. The data routing component with the access function may determine that the circular data path to which the component corresponding to the identifier of the destination component is coupled is another longitudinal circular data path (that is, a longitudinal circular data path that is different from the corresponding longitudinal circular data path to which the data routing component is coupled). The data routing component with the access function may preferentially transmit the generated data to a preset corresponding lateral circular data path to which the data routing component is coupled. Similarly, the data routing component with the access function determines that the circular data path to which the destination component is coupled is another lateral circular data path (that is, a lateral circular data path that is different from the corresponding lateral circular data path to which the data routing component is coupled), and preferentially transmits the generated data to a preset longitudinal circular data path to which the data routing component is coupled. The advantage of this setting is that the data needs to undergo only one change in a ring from the data routing component of the source component to the destination component. For example, in FIG. 11, when the source component (for example, the data routing component 1820) accesses the destination component (the computing component 1836), the source component (the data routing component 1820) determines that a computing component (for example, an NPU) as a destination component is connected to a longitudinal circular data path, determines that a circular data path to which a component corresponding to the identifier of the destination component is coupled is another longitudinal circular data path 1802 (that is, a longitudinal circular data path that is different from the corresponding longitudinal circular data path to which the destination component is coupled), and preferentially transmits the generated data to a preset corresponding lateral circular data path (that is, the lateral data path 1801) to which the destination component is coupled. In this way, the data needs to undergo only one change in a ring at the data routing component 1824, reducing complexity of data transmission.

For example, the data routing component 1820 may determine, based on pre-stored information about each functional component (an identifier and a component type of each component), that the type of the computing component 1836 is the NPU. It is determined, according to a pre-stored setting that a component whose type is the NPU is coupled to the longitudinal circular data path and a component whose type is the MEM is coupled to the lateral circular data path, that the computing component 1836 is coupled to the longitudinal circular data path. The data routing component 1820 may preferentially transmit the data D to the lateral circular data path 1801 to which the data routing component 1820 is coupled.

The data routing component 1820 transmits the generated data D to the lateral circular data path 1801. A component coupled to the lateral circular data path 1801 may detect a data packet on the circular data path 1801. For example, the storage component 1835 may detect the data D on the lateral circular data path 1801. The storage component 1835 may determine whether to receive the data D by determining whether the identifier of the destination component in the data D is consistent with the identifier of the storage component 1835. If the storage component 1835 may determine that the identifier of the destination component in the data D is the same as the identifier of the storage component 1835, the storage component 1835 determines to receive the data D.

The first address set stored in the data routing component 1824 includes an identifier of a component coupled to the lateral circular data path 1801 and an identifier of another component coupled to the longitudinal circular data path 1802. The data routing component 1824 may determine whether the identifier of the destination component carried in the data D is consistent with the identifier in the stored first address set. The data routing component 1824 may determine that the identifier of the destination component carried in the data D is consistent with an identifier in the first address set (a component corresponding to the identifier is the computing component 1802), receive the data D from the lateral circular data path 1801, and store the data D in a buffer inside the data routing component 1824. The data routing component 1824 fetches the data D from the buffer and forwards (forwards and routes) the data D to the longitudinal circular data path 1802 coupled to the component corresponding to the identifier, so that the computing component 1836 receives the data D.

The data D further carries identifiers of at least one forwarding component. The data routing component 1824 may determine that one of the identifiers of the at least one forwarding component carried in the data D is consistent with an identifier of the data routing component 1824, receive the data D from the lateral circular data path 1801, and store the data D in a buffer inside the data routing component 1824. The data routing component 1824 fetches the data D from the buffer and forwards (forwards and routes) the data D to the longitudinal circular data path 1802 coupled to the component corresponding to the identifier, so that the computing component 1802 receives the data D.

A component coupled to the longitudinal circular data path 1802 may detect whether the identifier of the destination component carried in the data D on the longitudinal circular data path 1802 is consistent with an identifier of the component. If the computing component 1836 may determine that the identifier of the destination component carried in the data D is consistent with the identifier of the computing component 1836, the computing component 1836 receives the data D.

The interconnection system provided in this embodiment of this application may be applied to the AI field, and is integrated on a chip, for example, an SoC chip. In an example, the computing component is an NPU, the storage component is a MEM, and a plurality of data routing components included in the SoC chip may be data routing components with access functions, for example, a CPU, a NIC, or a PCIE.

Figure 12:
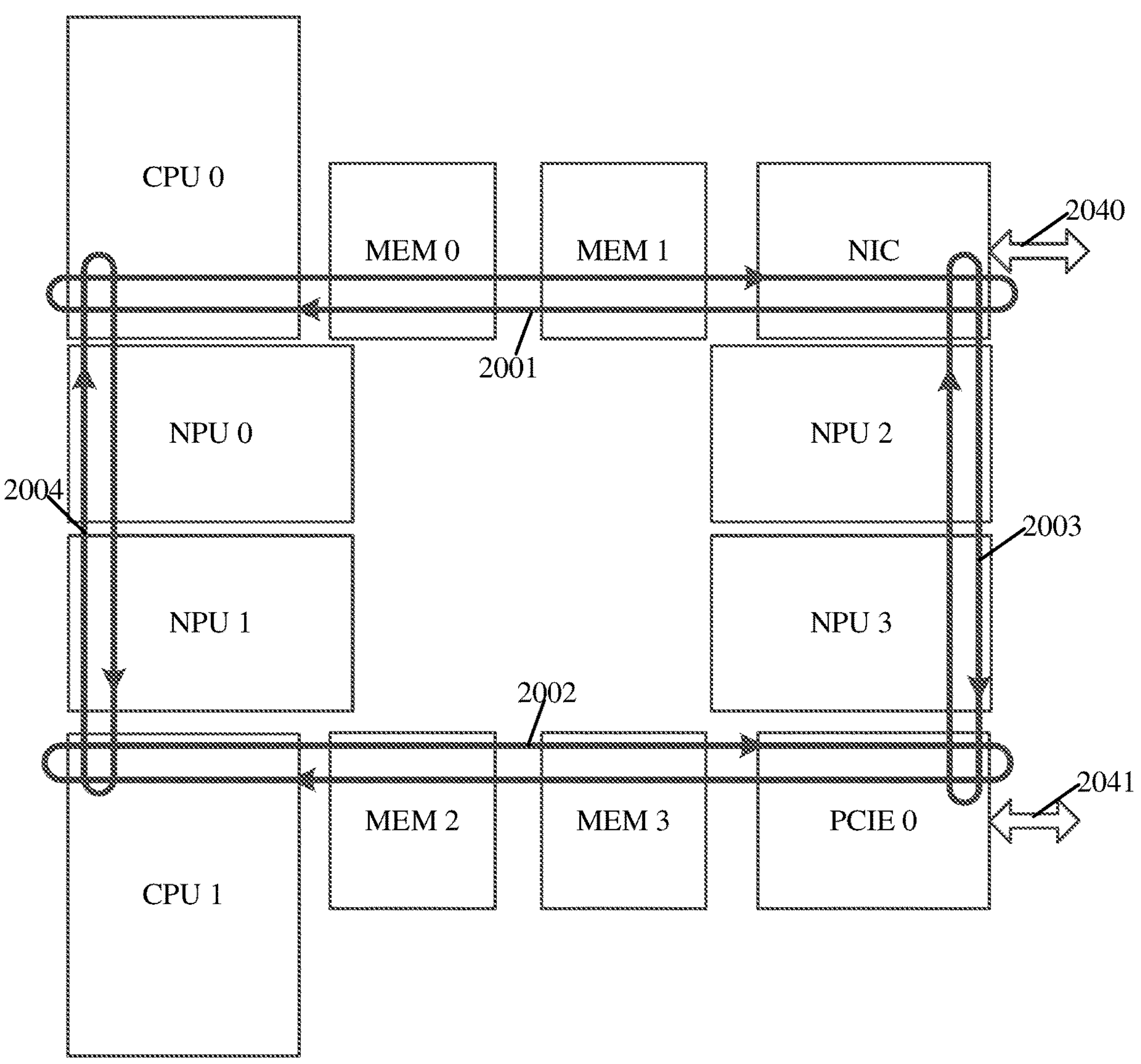
FIG. 12 is a schematic structural diagram of an interconnection system according to this application.

As shown in FIG. 12, in an actual arrangement, the SoC includes a plurality of circular data paths (namely, a lateral circular data path 2001, a lateral circular data path 2002, a longitudinal circular data path 2003, and a longitudinal circular data path 2004). A data routing component is correspondingly disposed at an intersection on each lateral circular data path and each longitudinal circular data path. For example, a data routing component is correspondingly disposed as a CPU 0 at an intersection on the lateral circular data path 2001 and the longitudinal circular data path 2004, and a data routing component is correspondingly disposed as a NIC at an intersection on the lateral circular data path 2001 and the longitudinal circular data path 2003. A data routing component is correspondingly disposed as a CPU 1 at an intersection on the longitudinal circular data path 2004 and the lateral circular data path 2002. A data routing component is correspondingly disposed as a PCIE 0 at an intersection on the lateral circular data path 2002 and the longitudinal circular data path 2003. In other words, the data routing component is the CPU 0 and is coupled to the corresponding lateral circular data path 2001 and the corresponding longitudinal circular data path 2004. The NIC is coupled to the corresponding lateral circular data path 2001 and the corresponding longitudinal circular data path 2003. The CPU 1 is coupled to the corresponding longitudinal circular data path 2004 and the corresponding lateral circular data path 2002. The PCIE 0 is coupled to the corresponding lateral circular data path 2002 and the corresponding longitudinal circular data path 2003.

In this embodiment of this application, the CPU 0, the CPU 1, the NIC, and the PCIE are, for example, data routing components with active access functions. When accessing a destination component, the CPU 0, the CPU 1, the NIC, and the PCIE may transmit generated data to a lateral circular data path to which the CPU 0, the CPU 1, the NIC, or the PCIE is coupled.

The SoC may further include a plurality of functional components located at non-intersections on the circular data paths (for example, an NPU 0, an NPU 1, an NPU 2, an NPU 3, a MEM 0, a MEM 1, a MEM 2, and a MEM 3). The MEM 0 and the MEM 1 are separately coupled at non-intersections on the lateral circular data path 2001. The NPU 0 and NPU 1 are separately coupled at non-intersections on the longitudinal circular data path 2004. The MEM 2 and the MEM 3 are separately coupled at non-intersections on the lateral circular data path 2002. The NPU 2 and NPU 3 are separately coupled at non-intersections on the longitudinal circular data path 2003.

When accessing a destination component, the functional components such as the NPU 0, the NPU 1, the NPU 2, and the NPU 3 transmit the data to a longitudinal circular data path to which the NPU 0, the NPU 1, the NPU 2, or the NPU 3 is coupled. If there is a requirement, if a circular data path to which the destination component is coupled is a lateral circular data path, the data is forwarded to the lateral circular data path by the data routing component at the intersection on the longitudinal circular data path to which the destination component is coupled. When accessing the destination component, the functional components such as the MEM 0, the MEM 1, the MEM 2, and the MEM 3 transmit the data to the lateral circular data path to which the MEM 0, the MEM 1, the MEM 2, or the MEM 3 is coupled. If there is a requirement, if a circular data path to which the destination component is coupled is a longitudinal circular data path, the data is forwarded to the longitudinal circular data path by the data routing component at the intersection on the lateral circular data path to which the destination component is coupled.

In the SoC in the AI field, any NPU may exchange data with any MEM. However, the data is not exchanged between NPUs. The data is not exchanged between MEMs. The data routing component with the access function can exchange the data with any NPU or any MEM. Therefore, the data routing component with the access function is coupled at an intersection on the corresponding lateral circular data path and the corresponding longitudinal circular data path, the NPU is disposed at a non-intersection on the corresponding longitudinal circular data path, and the MEM is disposed at a non-intersection on the lateral circular data path. In such a design, data packets can be forwarded through at most one data routing component to the destination component.

In a scenario in which the computing power of the SoC is improved, new cores (for example, new NPUs) can be added to expand the SoC. For example, a newly added core is connected to a non-intersection on a circular data path. FIG. 12 is a simplified example diagram of an SoC according to an embodiment of this application. A circular data path in the SoC may be disposed on the component, to reduce an area occupied by the SoC. In some implementations, a data routing component is correspondingly disposed as a NIC at an intersection on the lateral circular data path 2001 and the longitudinal circular data path 2003. The NIC may communicate with another device through an interface 2040. For example, data in the SoC is sent to another device, or data sent by another device may be received and provided to the SoC. For example, a component in the SoC may communicate with another device through a NIC. The NIC encapsulates the data provided by the component in the SoC into a frame, and transmits the data frame to another device through the interface 2040. Alternatively, the NIC may receive, through the interface 2040, a data frame sent by another device, and then reassemble the received data frame into data, and provide the data to the component in the SoC.

In some implementations, a data routing component of a PCIE 0 is correspondingly disposed at an intersection on the lateral circular data path 2002 and the longitudinal circular data path 2003. The PCIE 0 may have at least one PCIE port 2041. The PCIE 0 may be coupled, through the port 2040, to another device, for example, another PCIE device. The PCIE 0 may also be coupled to a PCIE system through the port 2040.

The PCIE in this embodiment of this application is a component that complies with any existing PCIE standard (the PCIE specification) or a future PCIE standard (the PCIE specification). The PCIE component in this embodiment of this application may support at least one lane, for example, 1, 2, 4, 8, 12, 16, or 32 lanes. A peak bandwidth of a single lane is not excessively limited in this application. The PCIE may communicate with another device through the port 2041. The PCIE may include a plurality of layers, for example, a transaction layer, a data link layer, and a physical layer. For example, during communication between the PCIE and another device, a data packet may reach a plurality of corresponding layers of another device through the plurality of layers of the PCIE during transmission, and the data packet reaches a core of the another device after going through the plurality of corresponding layers of the another device. A communication process between the PCIE and another device is not limited in this embodiment of this application.

Figure 13:
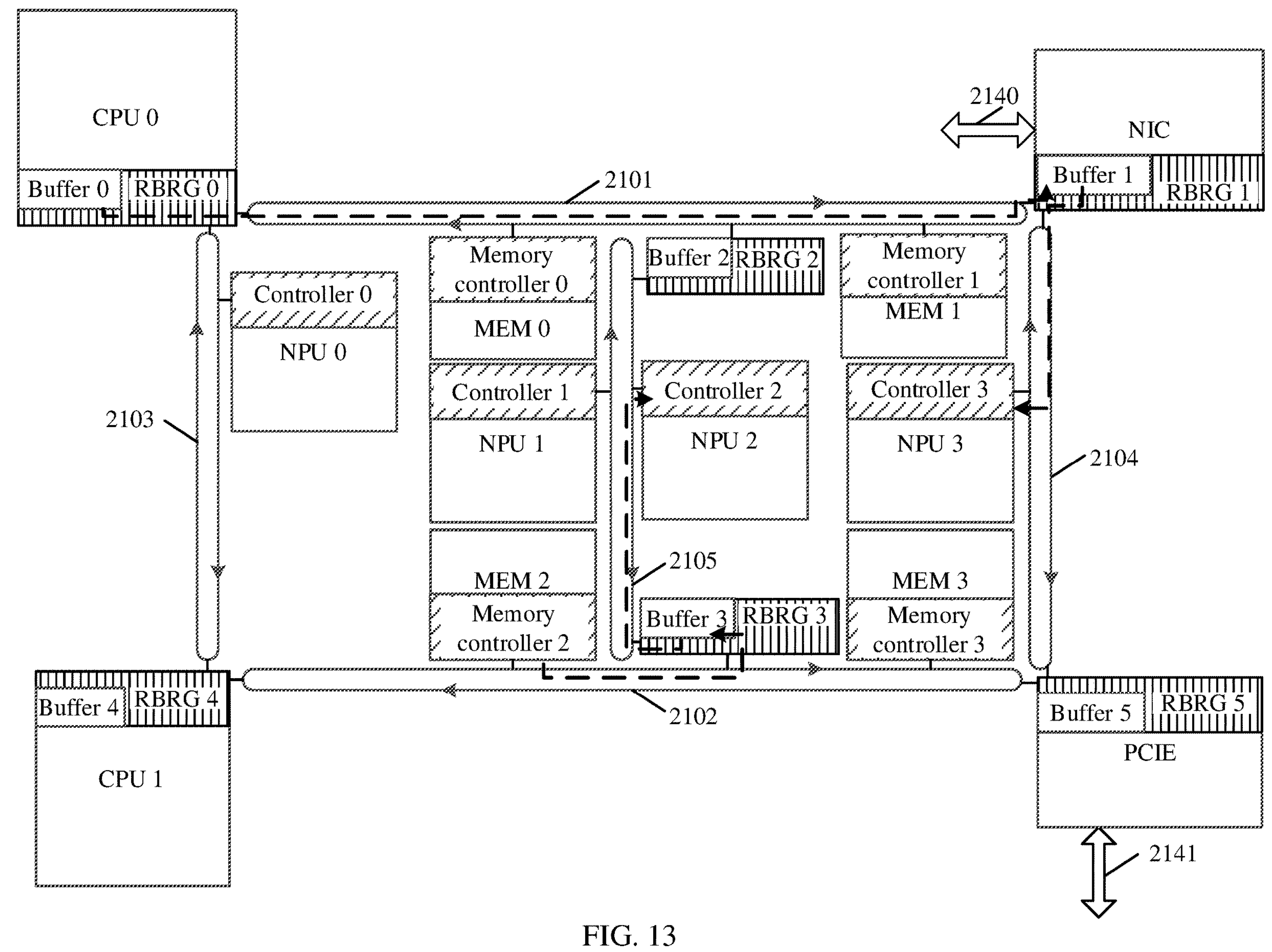
FIG. 13 is a schematic diagram of a data transmission process of an interconnection system according to this application.

FIG. 13 shows an SoC of a multi-ring-based on-chip interconnection structure. The SoC may include a plurality of circular data paths. The plurality of circular data paths include at least one lateral circular data path, for example, a lateral circular data path 2101 and a lateral circular data path 2102, and at least one longitudinal circular data path, for example, a longitudinal circular data path 2103, a longitudinal circular data path 2104, and a longitudinal circular data path 2105.

The plurality of circular data paths in the SoC may be arranged in a mesh. As shown in FIG. 13, each lateral circular data path and each longitudinal circular data path are arranged in a mesh, and at least one mesh may be formed. A data routing component is disposed at an intersection on each lateral circular data path and each longitudinal circular data path, and the data routing component is coupled at the intersection on the corresponding lateral circular data path and the corresponding longitudinal circular data path. The data routing component can exchange data between two circular data paths. In this embodiment of this application, the data routing component may be a component, for example, a CPU, a NIC, a PCIE, or an RBRG. For example, the data routing component of the CPU 0 is correspondingly disposed at an intersection on the lateral circular data path 2101 and the longitudinal circular data path 2103. A data routing component of an RBRG 2 is correspondingly disposed at an intersection on the lateral circular data path 2101 and the longitudinal circular data path 2105.

In a possible implementation, the data routing component may be a data routing component with an active access function, for example, a CPU 0, a CPU 1, a NIC, or a PCIE. The data routing component may alternatively be a data routing component without an active access function, for example, an RBRG 2 or an RBRG 3. The data routing component with the active access function may include a data routing component without the active access function. For example, the CPU 0 may include an RBRG 0. As shown in FIG. 13, each RBRG may include a buffer. For example, the RBRG 2 includes a buffer 2. The buffer in the RBRG may be used to forward data on one circular data path to another circular data path. Each data routing component may further include service logic for routing, buffering, transmitting, managing data received and transmitted from the lateral circular data path, and managing data received and transmitted from the longitudinal circular data path.

When the data routing component with the active access function transmits the data generated by the data routing component, the generated data may be stored in the buffer of the data routing component, and the RBRG in the data routing component fetches the data from the buffer, and transmits the data to a circular data path to which the RBRG is coupled. For example, the CPU 0 accesses an NPU 3. The CPU 0 may generate data E, and store the data E in a buffer 0. The RBRG 0 in the CPU 0 fetches the data E from the buffer 0, and transmits the data E to the lateral circular data path 2101 to which the CPU 0 is coupled.

When forwarding data between two circular data paths, the data routing component may receive the data from one circular data path, and store the data into a buffer of the data routing component. The RBRG in the data routing component fetches the data from the buffer and transmits the data to another circular data path to which the data routing component is coupled. For example, the NIC forwards the data E for the CPU 0 to access the NPU 3, and the RBRG 1 in the NIC may receive the data E from the lateral circular data path 2101, and store the data E in a buffer 1. The RBRG 1 in the NIC fetches the data E from the buffer 1, and transmits the data E to the longitudinal circular data path 2104.

The SoC further includes at least one functional component. One functional component is coupled at a non-intersection on one of a plurality of circular data paths in the SoC. The functional component may transmit the data to another circular data path through a data routing component coupled at an intersection on another circular data path and the coupled circular data path. The functional component may be a computing component or a storage component. The computing component has a capability or function of processing a computing task, for example, an NPU. The storage component has the capability or function of processing a storage task, for example, a MEM.

As shown in FIG. 13, the NPU may include a controller, and the controller in the NPU may control receiving and transmission of data. The NPU may further include service logic that manages data received and transmitted from the lateral circular data path and data received and transmitted from the longitudinal circular data path, and may also include service logic related to processing a computing task. The MEM may include a memory controller, and the memory controller may control receiving and transmission of data. The MEM may further include service logic that manages data received and transmitted from the lateral circular data path and data received and transmitted from the longitudinal circular data path, and may also include service logic related to processing a storage task (a data read/write task).

When each functional component receives the data, a controller in each functional component may detect the data on a circular data path to which the functional component is coupled, and receive the data if determining that an identifier of a destination component carried in the data is consistent with an identifier of the functional component. For example, the CPU 0 accesses the NPU 3, and a controller 3 in the NPU 3 may detect the data on the longitudinal circular data path 2104. The controller 3 in the NPU 3 may determine that the identifier of the destination component carried in the data E is consistent with an identifier of the NPU 3, and receive the data E.

When each functional component transmits the data, a controller in each functional component may transmit the generated data to a circular data path to which the functional component is coupled. For example, the MEM 2 accesses the NPU 2, and a storage controller 2 in the MEM 2 may be controlled to transmit generated data F to the lateral circular data path 2102 to which the MEM 2 is coupled.

In a data transmission process implemented according to the plurality of implementations of the foregoing multi-ring-based on-chip interconnection structure in this embodiment of this application, in the data transmission manner provided in this embodiment of this application, data exchange between components can be implemented, and a data transmission process can be simplified by performing only one change in a ring.

Figure 14:
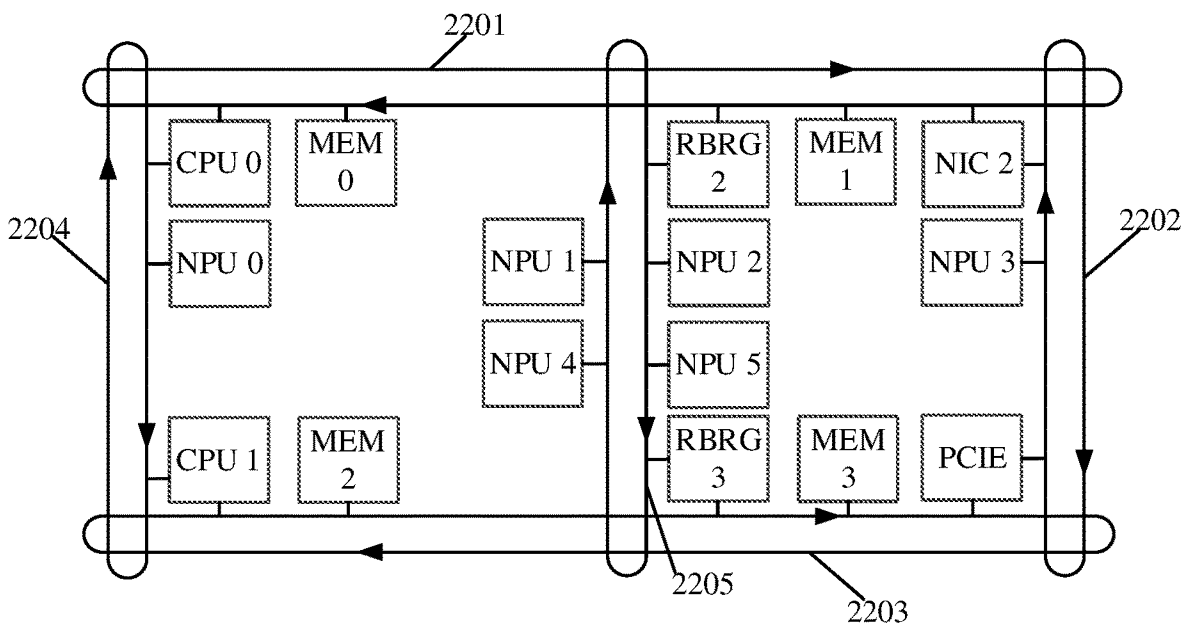
FIG. 14 is a schematic structural diagram of an interconnection system according to this application.

Because the NPU and the MEM usually require a large bandwidth, if a plurality of NPUs or a plurality of MEMs are arranged on two sides of a same circular data path, a bandwidth obtained by each NPU or MEM is limited. For example, the NPU 1, the NPU 2, the NPU 4, and the NPU 5 in FIG. 14 are arranged on two sides of the longitudinal circular data path 2205, and bandwidths obtained by the NPU 1, the NPU 2, the NPU 4, and the NPU 5 respectively are limited. In addition, the longitudinal circular data path 2205 has a relatively high overall transmission delay. Preferably, the plurality of NPUs or the plurality of MEMs on a same circular data path are disposed on a same side of the circular data path.

Figure 15:
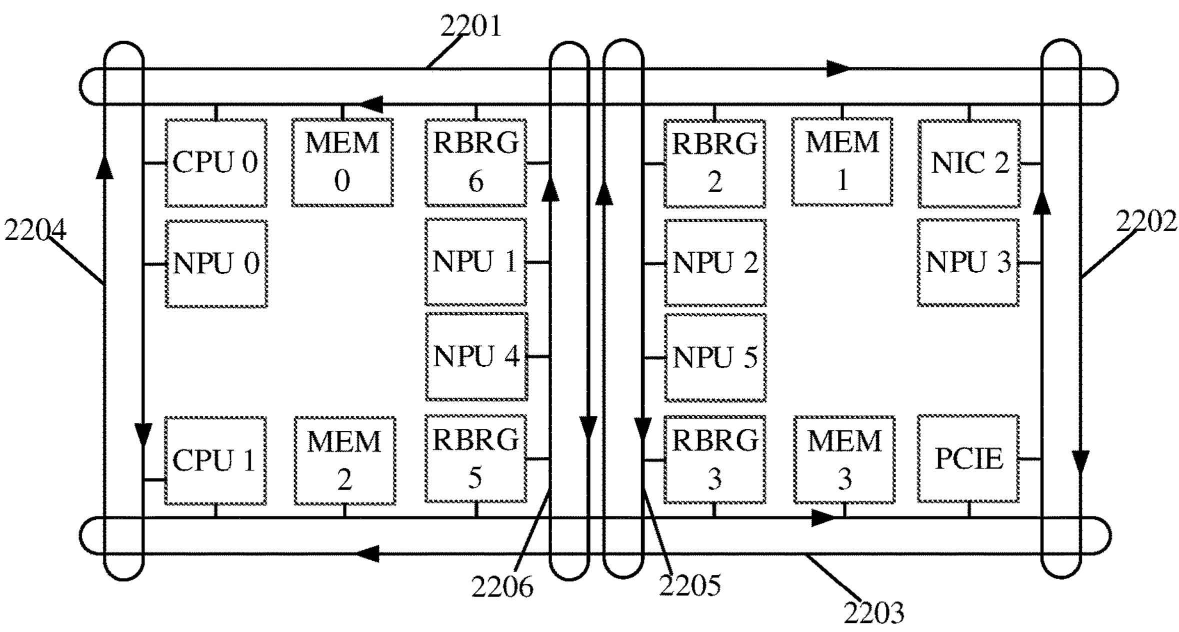
FIG. 15 is a schematic structural diagram of another interconnection system according to this application.

In a possible implementation, as shown in FIG. 15, in the multi-ring-based on-chip interconnection structure provided in this application, a plurality of NPUs coupled to a circular data path are arranged on a same side of the circular data path. The NPUs are arranged on the same side of the circular data path. Both the NPU 1 and the NPU 4 are coupled to a longitudinal circular data path 2206, and both the NPU 2 and the NPU 5 are coupled to a longitudinal circular data path 2205. Compared with that the NPU 1, the NPU 2, the NPU 4, and the NPU are coupled to a same circular data path, in the interconnection structure shown in FIG. 15, the NPU 1 and the NPU 4 can obtain more bandwidths, and the NPU 2 and the NPU 5 may also obtain more bandwidths, so that an overall transmission delay of the longitudinal circular data path 2205 is relatively low, and an overall transmission delay of the longitudinal circular data path 2206 is relatively low.

Figure 16:
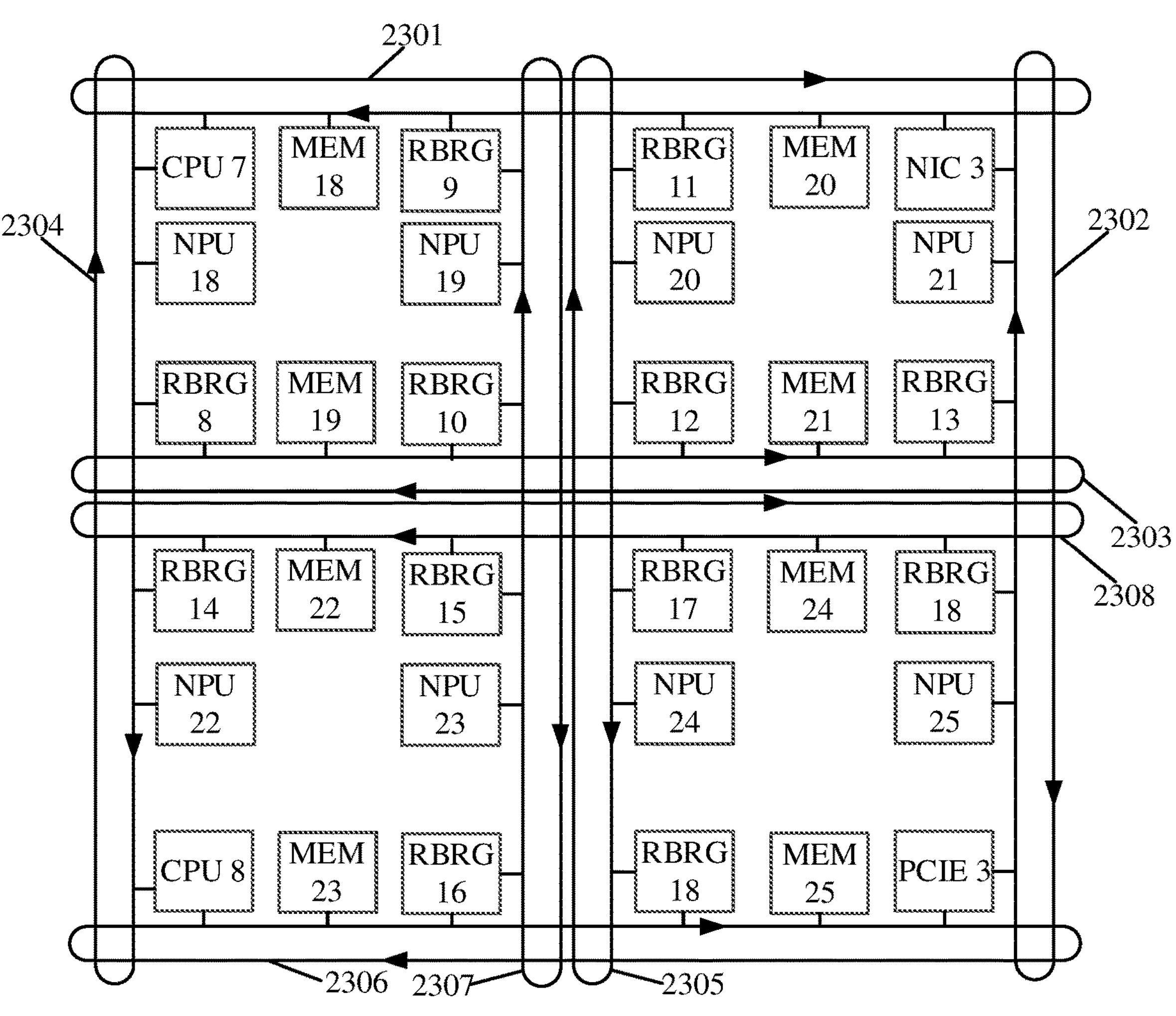
FIG. 16 is a schematic structural diagram of still another interconnection system according to this application.

In still another possible implementation, as shown in FIG. 16, in the multi-ring-based on-chip interconnection structure provided in this application, a plurality of NPUs are arranged on a same side of one longitudinal circular data path. For example, a plurality of NPUs (an NPU 18 and an NPU 22) on the longitudinal circular data path 2304 are arranged on a same side (a side close to the longitudinal circular data path 2307) of the longitudinal circular data path 2304. A plurality of MEMs are arranged on a same side of the lateral circular data path. For example, a plurality of MEMs (a MEM 18 and a MEM 20) on the lateral circular data path 2301 are arranged on a same side (a side close to the lateral circular data path 2303) of the lateral circular data path 2301.

In the interconnection structures shown in FIG. 13, FIG. 14, FIG. 15, and FIG. 16, the plurality of circular data paths in the interconnection structure are arranged in a mesh, and a plurality of meshes are formed. Neighboring meshes may have at least one common circular data path. It should be understood that the scope of the present application is not limited. In another embodiment, a plurality of circular data paths in the interconnection structure are arranged in a mesh, and more meshes are formed.

The following describes in detail a method for transmitting data in an interconnection system according to an embodiment of this application. The method is applicable to the interconnection system in this embodiment of this application.

For example, the interconnection system includes: a plurality of circular data paths, where the plurality of circular data paths include at least one lateral circular data path and at least one longitudinal circular data path; a data routing component, correspondingly disposed at an intersection on the at least one lateral circular data path and the at least one longitudinal circular data path, where the data routing component is separately coupled to the corresponding lateral circular data path and the corresponding longitudinal circular data path; and at least one functional component, further coupled at a non-intersection on at least one of the at least one lateral circular data path and the at least one longitudinal circular data path.

In the method of this embodiment, the at least one functional component transmits the generated data to a coupled circular data path. A data routing component coupled at an intersection on the coupled circular data path and another circular data path receives the data. The data routing component forwards the received data to the another circular data path, so that a destination component receives the data.

In a possible design, the data carries an address of a destination component. If the data routing component may determine that the address of the destination component carried in the data is consistent with an address in a pre-stored first address set, the data routing component receives the data and forwards the received data to the another circular data path, where the first address set includes an address of another component coupled to the lateral circular data path corresponding to the data routing component and an address of another component coupled to the longitudinal circular data path corresponding to the data routing component. The destination component located on the another circular data path may receive the data if determining that the address of the destination component carried in the data is consistent with the address of the destination component.

In another possible design, the data may carry an address of a destination component and addresses of at least one forwarding component. One of the at least one forwarding component is a component that forwards the data on a path through which the functional component transmits the data to the destination component, for example, a data routing component at an intersection on circular data paths to which the functional component is coupled and another circular data path, and is configured to forward the data on the path.

The data routing component may determine that the address of the forwarding component is consistent with the address of the data routing component, receive the data, and forward the received data to the another circular data path. The destination component located on the another circular data path may receive the data if determining that the address of the destination component carried in the data is consistent with the address of the destination component.

Figure 17:
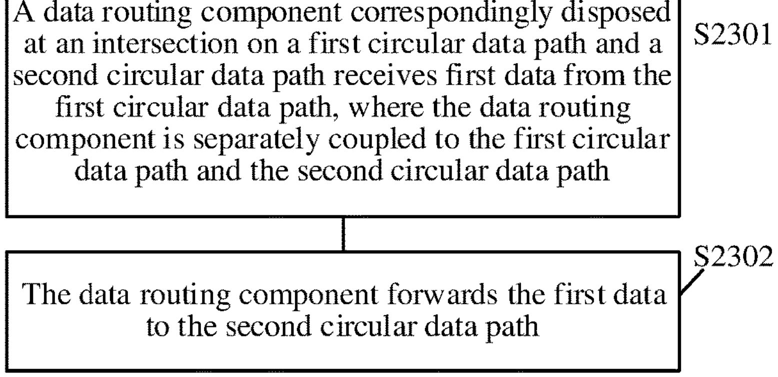
FIG. 17 is a schematic flowchart of a data transmission method according to this application.

FIG. 17 shows a data transmission method implemented by a data routing component in an interconnection system according to an embodiment of this application.

The method may include the following steps.

Step S2301: A data routing component correspondingly disposed at an intersection on a first circular data path and a second circular data path receives first data from the first circular data path, where the data routing component is separately coupled to the first circular data path and the second circular data path.

The first data may be generated by a functional component coupled at a non-intersection on the first circular data path, and transmitted to the first circular data path.

Step S2302: The data routing component forwards the first data to the second circular data path.

The destination component corresponding to the first data may be any functional component coupled to the second circular data path. The destination component corresponding to the first data may alternatively be another data routing component coupled to the second circular data path.

In a possible implementation, in a process of performing step S2302, before transmitting the first data to the second circular data path, the data routing component may monitor or detect the second circular data path, to determine whether the second circular data path is idle or in an idle time period. The data routing component may transmit the first data to the second circular data path when the second circular data path is idle, and transmit the first data to the second circular data path during the idle time period of the second circular data path.

In a possible implementation, specifically, the first data may carry an identifier of a destination component. The data routing component may store a first address set in advance. The first address set may include an identifier of another component coupled to a lateral circular data path corresponding to the data routing component and an identifier of another component coupled to a longitudinal circular data path corresponding to the data routing component.

Before receiving the first data, the data routing component may determine whether the identifier of the destination component carried in the first data is consistent with an identifier in the first address set. The data routing component may determine that the address of the destination component carried in the first data is consistent with the identifier in the first address set, and receive the first data on the first circular data path.

The data routing component may store the first data in a buffer of the data routing component. The data routing component may fetch the first data from the buffer and forward the data to the second circular data path.

The component coupled to the second circular data path may detect the identifier of the destination component carried in the first data, determine that the identifier of the destination component carried in the first data is consistent with an identifier of the component, and receive the first data.

In still another possible implementation, the first data may carry an identifier of the destination component and identifiers of the at least one forwarding component. The data routing component may detect the identifiers of the at least one forwarding component carried in the first data, determine that one of the identifiers of the at least one forwarding component carried in the first data is consistent with an identifier of the data routing component, and receive the first data from the first circular data path. The data routing component may store the first data in a buffer of the data routing component. The data routing component may fetch the first data from the buffer and forward the data to the second circular data path. The component coupled to the second circular data path may detect the identifier of the destination component carried in the first data, determine that the identifier of the destination component carried in the first data is consistent with an identifier of the component, and receive the first data.

The interconnection system or the interconnection structure provided in embodiments of this application may be an integrated circuit, and may be integrated on a chip. The interconnection system can also be integrated into any processor-based electronic device, for example, a mobile terminal, a computer, a portable computer, a personal data assistant, a digital music player, a portable music player, a digital video player, a video player, a virtual reality device, an augmented reality device, a mixed reality device, a smart home device, and the like.

The interconnection system or the interconnection structure provided in embodiments of this application may be integrated into a chip. This application further provides a chip system. The chip system may include at least one interconnection system or interconnection structure provided in embodiments of this application. The method and system provided in embodiments of this application may be implemented in any electronic device or system.

Figure 18:
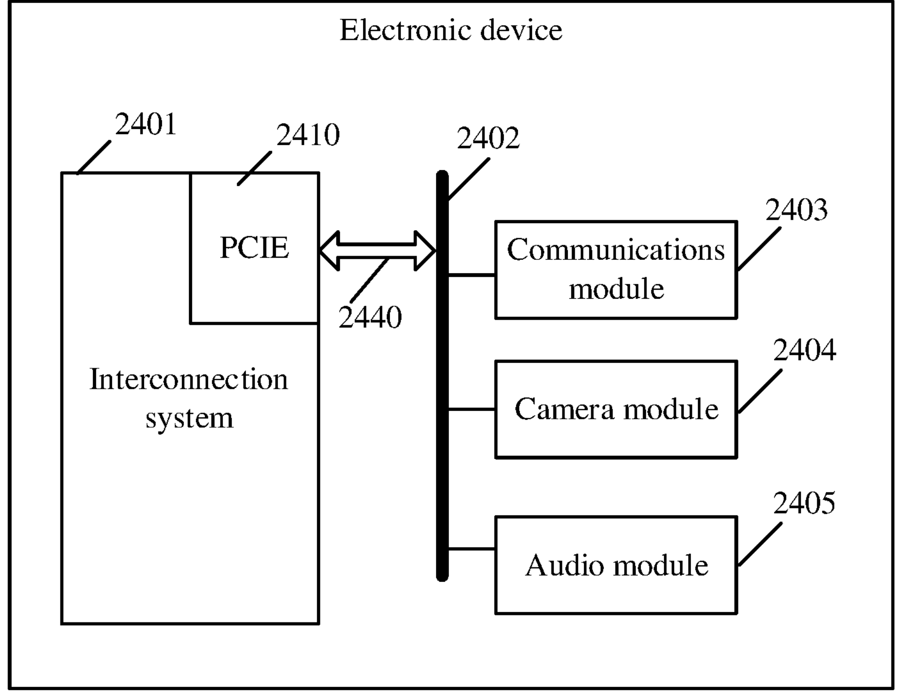
FIG. 18 is a schematic structural diagram of an electronic device according to this application.

FIG. 18 shows an electronic device, including at least one interconnection system 2401 provided in the foregoing embodiment of this application. The interconnection system may include a plurality of circular data paths, and a data routing component at an intersection on one lateral circular data path and one longitudinal circular data path may be a PCIE 2410. The interconnection system 2401 may further include components such as a CPU and a NIC. The interconnection system 2401 may also include components such as an NPU, a GPU, and a MEM.

The electronic device may further include at least one PCIE device. The PCIE device may be coupled to a port 2440 of the PCIE 2410. Alternatively, the PCIE device may be coupled to the PCIE 2410 through a bus 2402, and the bus 2402 may be coupled to the port 2440 of the PCIE 2410.

The electronic device may further include a communications module 2403, and the communications module 2403 may be coupled to the bus 2402. A component in the interconnection system may control the communications module 2403 or exchange data with the communications module 2403. The NPU in the interconnection system 2401 may perform calculation based on the data received by the communications module, and transmit a calculation result to an external device through the communications module.

The electronic device may further include a camera module 2404, and the camera module 2404 may be coupled to the bus 2402. The component in the interconnection system may control the camera module 2404 and control the camera module 2404 to collect an image. The NPU in the interconnection system may perform computing on the image, for example, perform image recognition calculation, image processing calculation, and the like. The MEM in the interconnection system may store the image, or store the calculation result.

The electronic device may further include an audio module 2405, and the audio module 2405 may be coupled to the bus 2402. The component in the interconnection system may control the audio module 2405, for example, control the audio module 2405 to collect audio. The NPU in the interconnection system may perform calculation on the audio, for example, perform audio recognition calculation, speech recognition calculation, and the like. The MEM in the interconnection system may also store the audio, or store an identification result.

The present application provides various method embodiments. In various embodiments, one or more operations of the method may be controlled or managed by, but are not limited thereto, software, firmware, hardware, or any combination thereof. The method may include the processes of embodiments of the present disclosure, which may be controlled or managed by a processor and/or a computing device under control of computer or computing device readable and executable instructions (or code). The computer or computing device readable and executable instructions (or code) may reside, for example, in a data storage apparatus, including a computer or computing device usable volatile memory, a computer or computing device usable non-volatile memory, and/or a computer or computing device usable mass data storage. The computer or computing device readable and executable instructions (or code) may alternatively reside in any type of a computer or computing device readable medium or memory. When a computer program and computer-readable instructions or code are executed on a processor and/or a computing device, the methods in embodiments of this application are performed.

The methods or processes of the various embodiments described above may be discussed in the general context of computer-executable instructions residing on one or more computers or other devices for execution (for example, on some form of a computer-readable storage medium of a program module). By way of example, but not limitation, the computer-readable storage medium may include a non-transitory computer storage medium and a communication medium. Generally, the program module includes routines, programs, objects, components, data structures, and the like that perform specific tasks or implement specific abstract data types. In various embodiments, functions of the program module may be combined or distributed according to a requirement.

The computer storage media include volatile and non-volatile, and removable and non-removable media implemented in any method or technology for storing information such as computer-readable instructions, data structures, program modules, or other data. The computer storage media include, but are not limited to, random access memory (RAM), read only memory (ROM), electrically erasable programmable read only memory (EEPROM), flash memory or other memory technology, optical disk ROM (CD-ROM), or any other medium that can be used to store the desired information and can be accessed to retrieve that information.

The communication medium may include computer-executable instructions, data structures, and program modules, and may include any information delivery medium. By way of example, but not limitation, communication media includes wired media, such as a wired network or a direct wired connection, and wireless media, such as sound, radio frequency (RF), infrared, and other wireless media. Any combination of the foregoing may also be included within the scope of a computer-readable storage medium.

The foregoing embodiments are merely used to describe the technical solutions of the present application, but are not intended to limit the present application. Although the present application is described in detail with reference to the foregoing embodiments, persons of ordinary skill in the art should understand that they may still make modifications to the technical solutions recorded in the foregoing embodiments, or make equivalent replacements to some technical features thereof. However, these modifications or replacements do not deviate from the spirit and scope of the technical solutions in embodiments of the present application.

What is claimed is:

1. A system, wherein the system comprises:

a plurality of circular data paths comprising a first lateral circular data path, a second lateral circular data path, a first longitudinal circular data path, and a second longitudinal circular data path;

a plurality of data routing components coupled to the plurality of circular data paths, wherein the plurality of data routing components comprise a first data routing component and a second data routing component, the first data routing component is disposed at a first intersection of and is coupled to the first lateral circular data path and the first longitudinal circular data path, and the second data routing component is disposed at a second intersection of and is coupled to the second lateral circular data path and the second longitudinal circular data path; and at least one functional component disposed at a non-intersection corresponding to one of the first lateral circular data path and the first longitudinal circular data path, wherein the at least one functional component is configured to transmit data to a destination component on another one of the first lateral circular data path and the first longitudinal circular data path through the first data routing component, wherein the at least one functional component is coupled only to the one of the first lateral circular data path and the first longitudinal circular data path;

wherein the data carries a destination address of the destination component; and wherein the first data routing component is configured to:

store a first address set, wherein the first address set comprises an address of a component coupled to the first lateral circular data path and an address of a component coupled to the first longitudinal circular data path;

determine that the destination address carried in the data is consistent with an address in the first address set; and in response to determining that the destination address carried in the data is consistent with the address in the first address set, receive the data and forward the data to the destination component.

2. The system according to claim 1, wherein the plurality of circular data paths are arranged in a mesh.

3. The system according to claim 1, wherein the at least one functional component comprises a plurality of functional components disposed at a plurality of non-intersections on one of the plurality of circular data paths, and the plurality of functional components are arranged on a same side of the one of the plurality of circular data paths.

4. The system according to claim 1, wherein the at least one functional component comprises at least one of a computing component and a storage component; and the computing component is configured to process a computing task, and the storage component is configured to process a storage task.

5. The system according to claim 4, wherein:

the at least one functional component comprises at least one computing component and at least one storage component;

each of the at least one computing component is coupled to a corresponding longitudinal circular data path; and each of the at least one storage component is coupled to a corresponding lateral circular data path.

6. The system according to claim 4, wherein the computing component comprises a neural network processor; and the storage component comprises a memory.

7. The system according to claim 1, wherein each of the plurality of data routing components is one of a central processing unit (CPU), a network interface controller (NIC), a peripheral component interconnect express (PCIE), or a ring bridge.

8. The system according to claim 1, wherein the data further carries one or more forwarding addresses of at least one forwarding component corresponding to the destination component, and the one or more forwarding addresses comprise an address of the first data routing component; and the first data routing component is further configured to:

determine that one of the one or more forwarding addresses carried in the data is consistent with the address of the first data routing component, receive the data, and forward the data to another circular data path of the plurality of circular data paths to which the first data routing component is coupled.

9. A method for transmitting data in an interconnection system, wherein the interconnection system comprises:

a plurality of circular data paths comprising a first lateral circular data path, a second lateral circular data path, a first longitudinal circular data path, and a second longitudinal circular data path;

a plurality of data routing components coupled to the plurality of circular data paths, wherein the plurality of data routing components comprise a first data routing component and a second data routing component, the first data routing component is disposed at a first intersection of and is coupled to the first lateral circular data path and the first longitudinal circular data path, and the second data routing component is disposed at a second intersection of and is coupled to the second lateral circular data path and the second longitudinal circular data path; and at least one functional component disposed at a non-intersection corresponding to one of the first lateral circular data path and the first longitudinal circular data path, and wherein the method comprises:

transmitting, by the at least one functional component, data to another one of the first lateral circular data path and the first longitudinal circular data path;

receiving the data by the first data routing component; and forwarding, by the first data routing component, the received data to a destination component on the other one of the first lateral circular data path and the first longitudinal circular data path, wherein the at least one functional component is coupled only to the one of the first lateral circular data path and the first longitudinal circular data path;

wherein the data carries a destination address of the destination component; and wherein the first data routing component is configured to:

store a first address set, wherein the first address set comprises an address of a component coupled to the first lateral circular data path and an address of a component coupled to the first longitudinal circular data path;

determine that the destination address carried in the data is consistent with an address in the first address set; and in response to determining that the destination address carried in the data is consistent with the address in the first address set, receive the data and forward the data to the destination component.

10. The method according to claim 9, wherein the data further carries one or more forwarding addresses of at least one forwarding component; the one or more forwarding addresses of the at least one forwarding component comprise an address of the first data routing component; and in response to determining that the address of the first data routing component is consistent with one of the one or more forwarding addresses, the first data routing component receives the data and forwards the data to another circular data path to which the first data routing component is coupled.

11. A system on a chip (SoC) chip, comprising an interconnection system, wherein the interconnection system comprises:

a plurality of circular data paths comprising a first lateral circular data path, a second lateral circular data path, a first longitudinal circular data path, and a second longitudinal circular data path;

a plurality of data routing components coupled to the plurality of circular data paths, wherein the plurality of data routing components comprise a first data routing component and a second data routing component, the first data routing component is disposed at a first intersection of and is coupled to the first lateral circular data path and the first longitudinal circular data path, and the second data routing component is disposed at a second intersection of and is coupled to the second lateral circular data path and the second longitudinal circular data path; and at least one functional component disposed at a non-intersection corresponding to one of the first lateral circular data path and the first longitudinal circular data path, wherein the at least one functional component is configured to transmit data to a destination component on another one of the first lateral circular data path and the first longitudinal circular data path through the first data routing component, wherein the at least one functional component is coupled only to the one of the first lateral circular data path and the first longitudinal circular data path;

wherein the data carries a destination address of the destination component; and wherein the first data routing component is configured to:

store a first address set, wherein the first address set comprises an address of a component coupled to the first lateral circular data path and an address of a component coupled to the first longitudinal circular data path;

determine that the destination address carried in the data is consistent with an address in the first address set; and in response to determining that the destination address carried in the data is consistent with the address in the first address set, receive the data and forward the data to the destination component.

12. The SoC chip according to claim 11, wherein the plurality of circular data paths are arranged in a mesh.

13. The SoC chip according to claim 11, wherein the at least one functional component comprises a plurality of functional components disposed at a plurality of non-intersections on one of the plurality of circular data paths, and the plurality of functional components are arranged on a same side of the one of the plurality of circular data paths.

14. The SoC chip according to claim 11, wherein the at least one functional component comprises at least one of a computing component and a storage component, the computing component is configured to process a computing task, and the storage component is configured to process a storage task.

15. The SoC chip according to claim 14, wherein the computing component comprises a neural network processor, and the storage component comprises a memory.

* * * * *